April 21, 1959 W. DE BACK ET AL 2,882,945
FRUIT PREPARATION MACHINE
Original Filed Sept. 6, 1949 14 Sheets-Sheet 5

INVENTORS
WILLIAM DE BACK
SYLVIO PUCCINELLI
BY Hans G. Hoffmeister
ATTORNEY

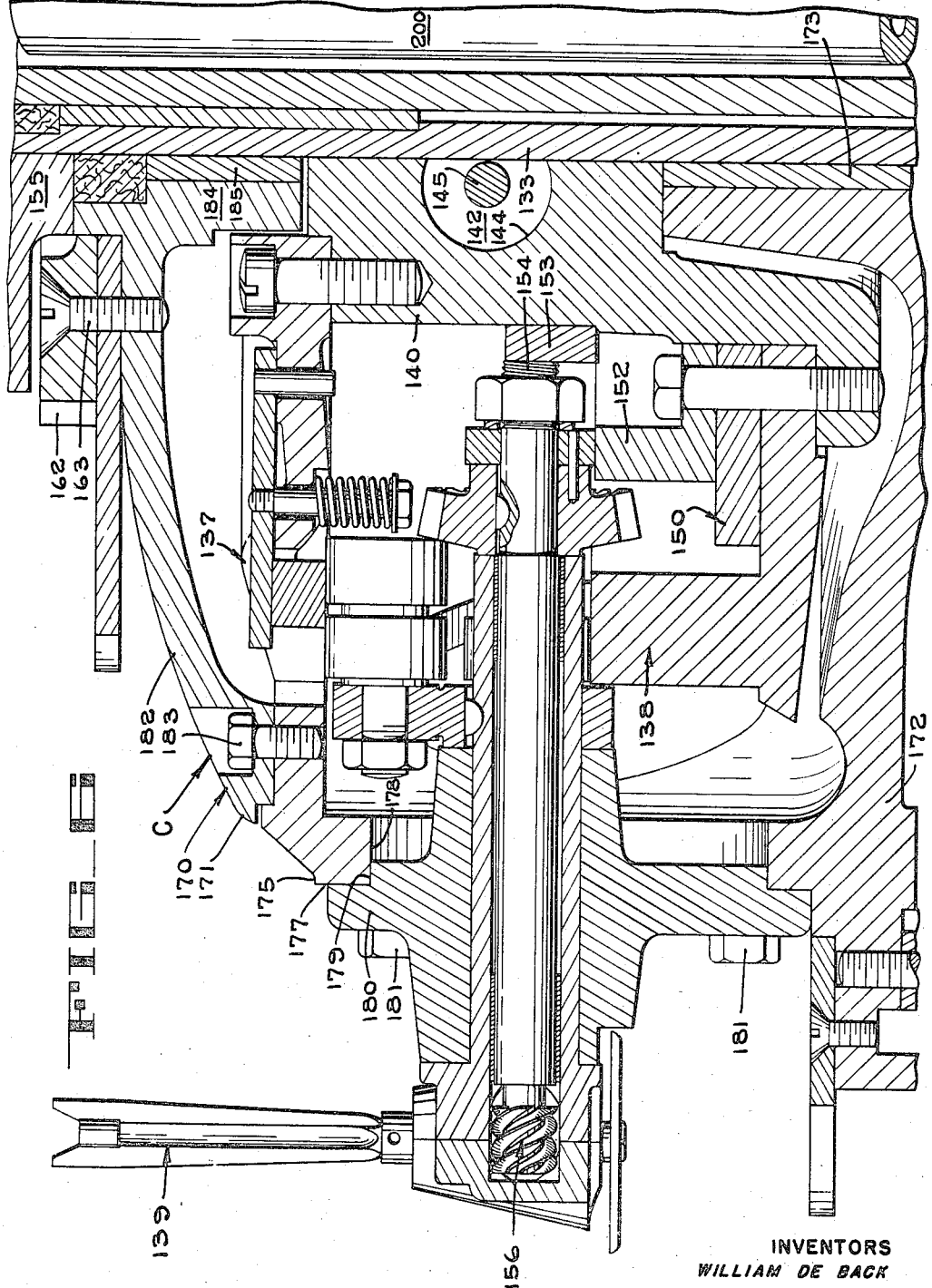

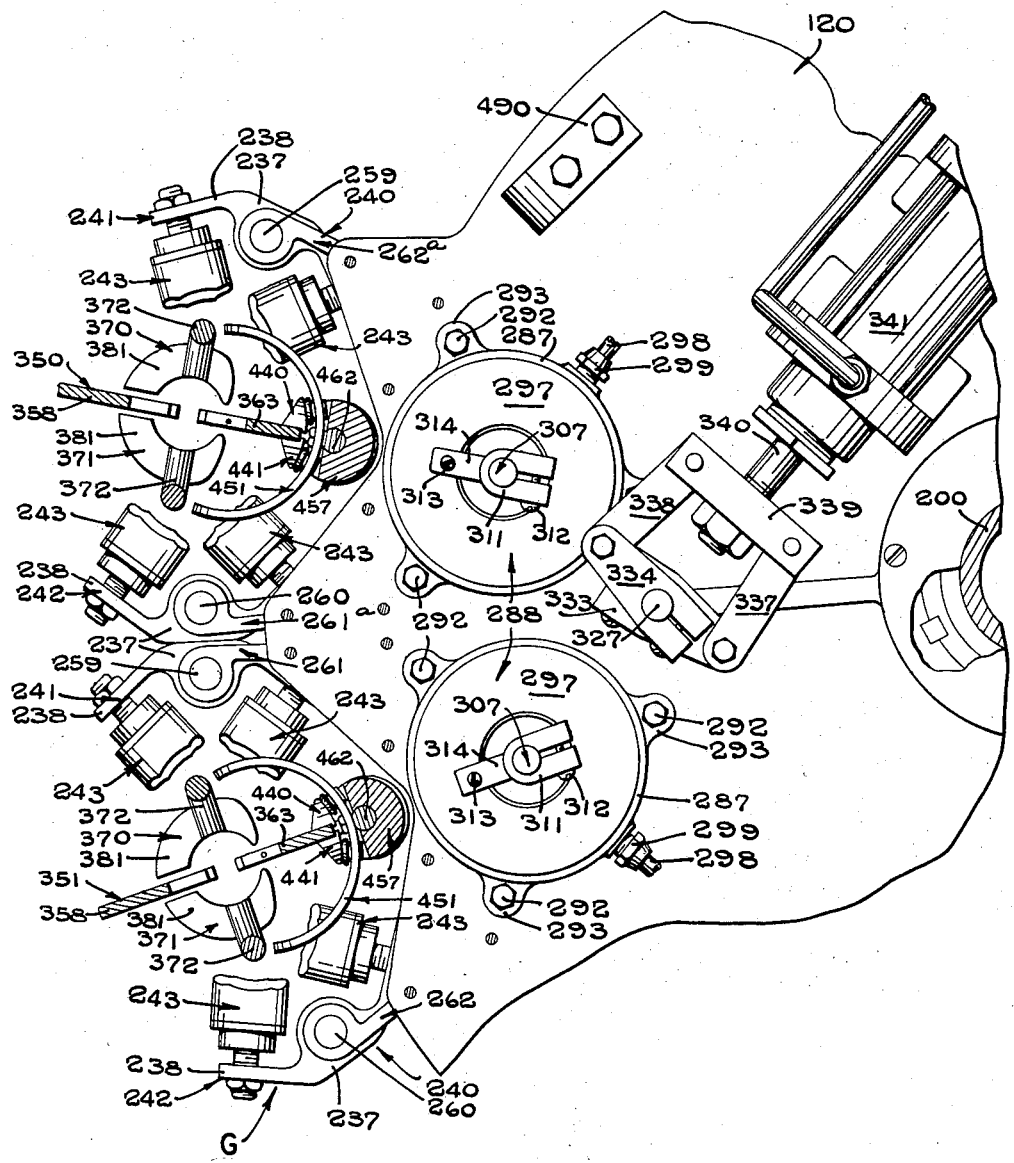
FIG_7
INVENTORS
WILLIAM DE BACK
SYLVIO PUCCINELLI
BY Hans G. Hoffmeister
ATTORNEY April 21, 1959
W. DE BACK ET AL
2,882,945
FRUIT PREPARATION MACHINE
Original Filed Sept. 6, 1949
14 Sheets-Sheet 8
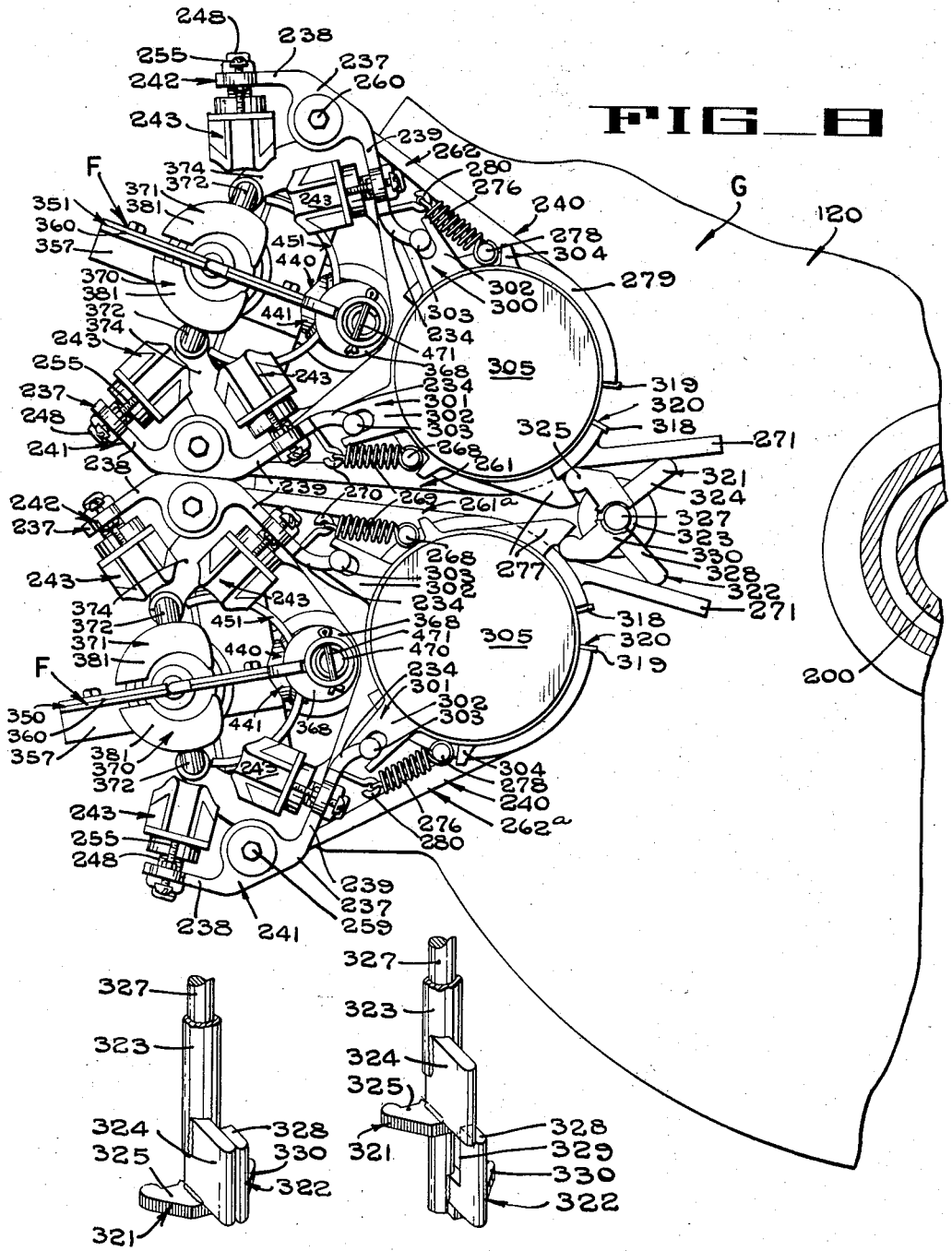
FIG_8
FIG_9   FIG_10
INVENTORS
WILLIAM DE BACK
SYLVIO PUCCINELLI
BY Hans G. Hoffmeister
ATTORNEY

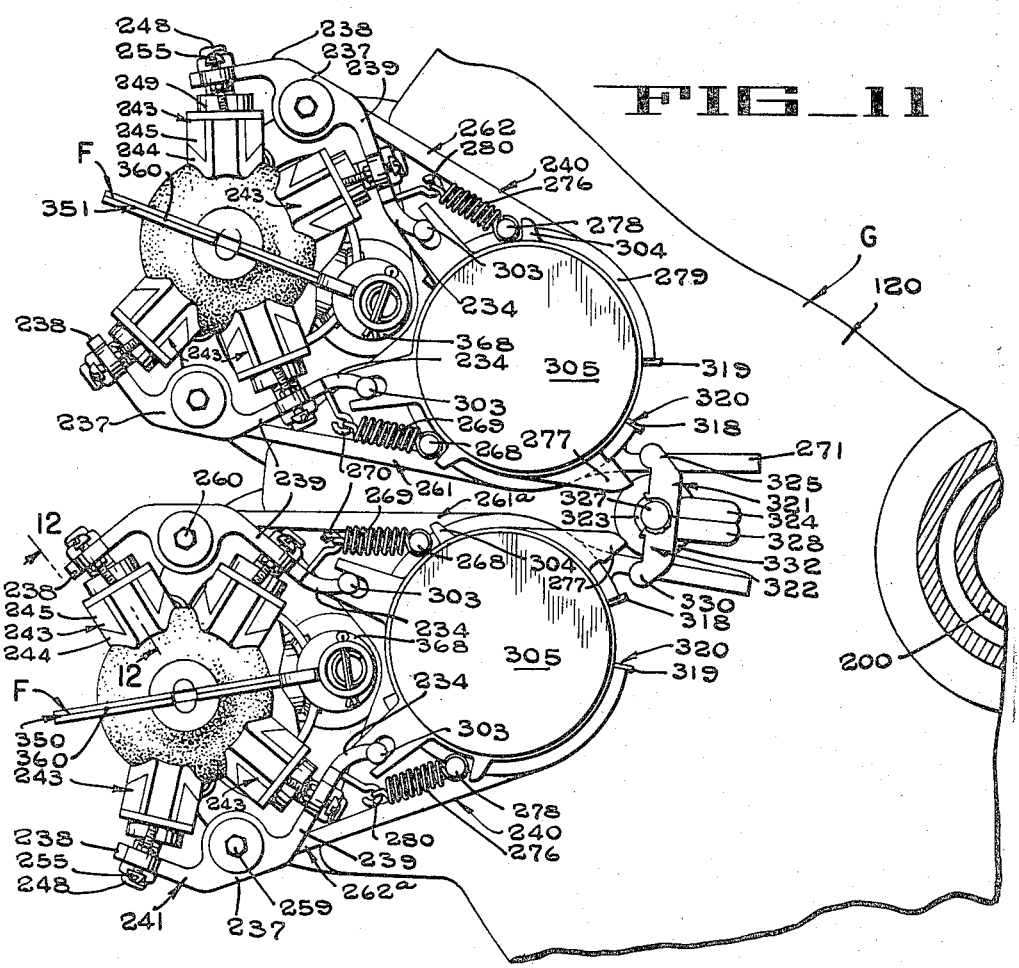
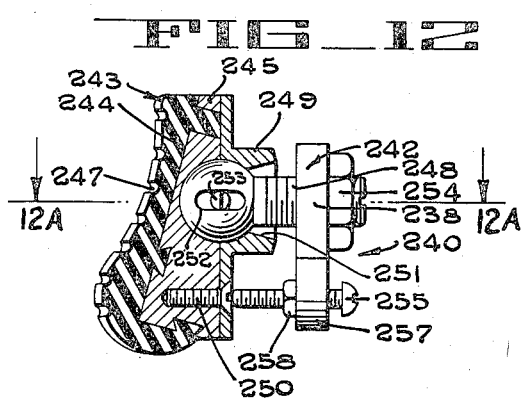
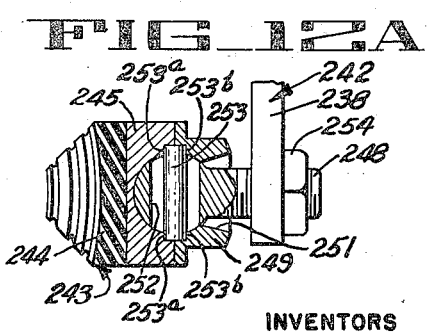

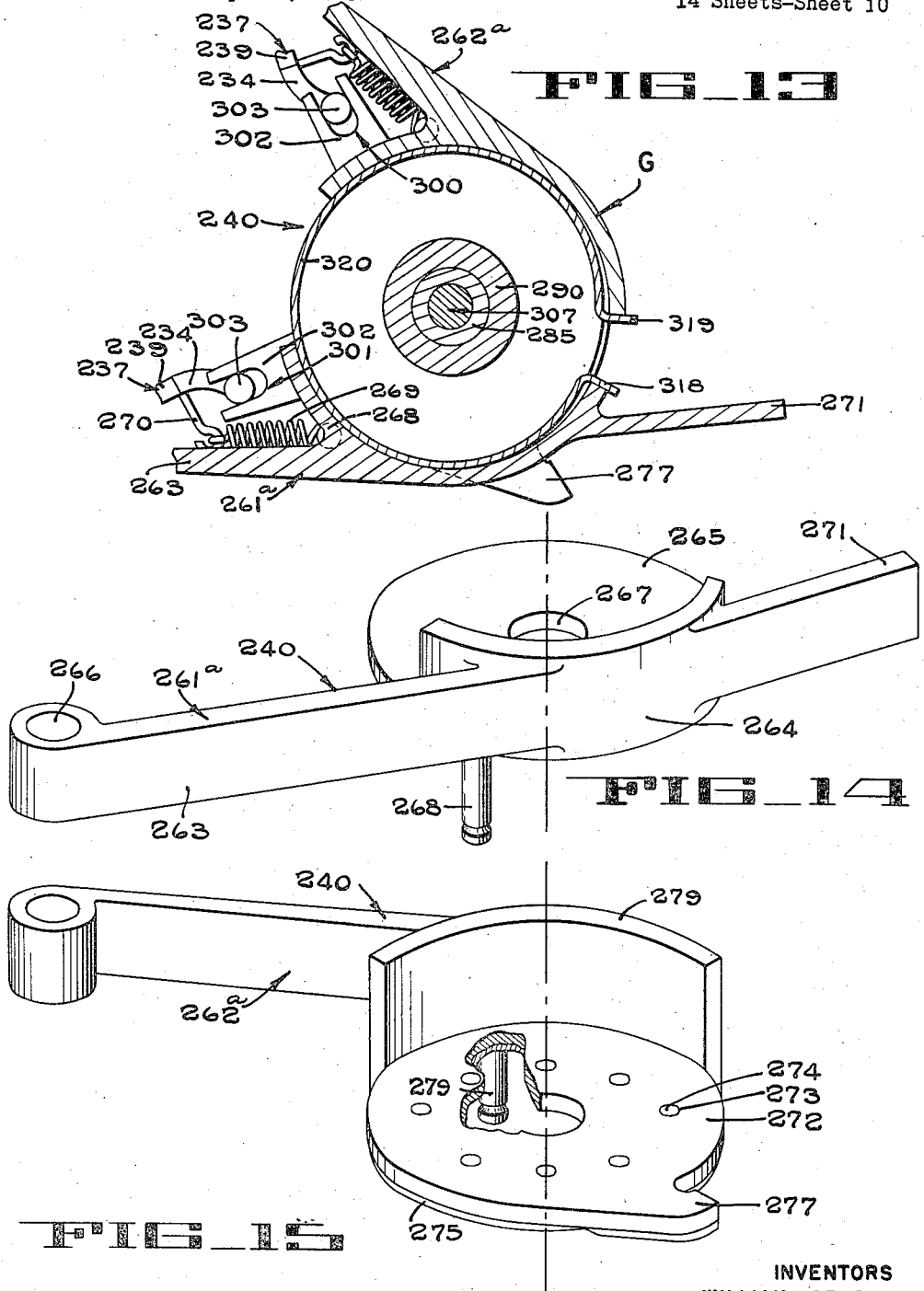

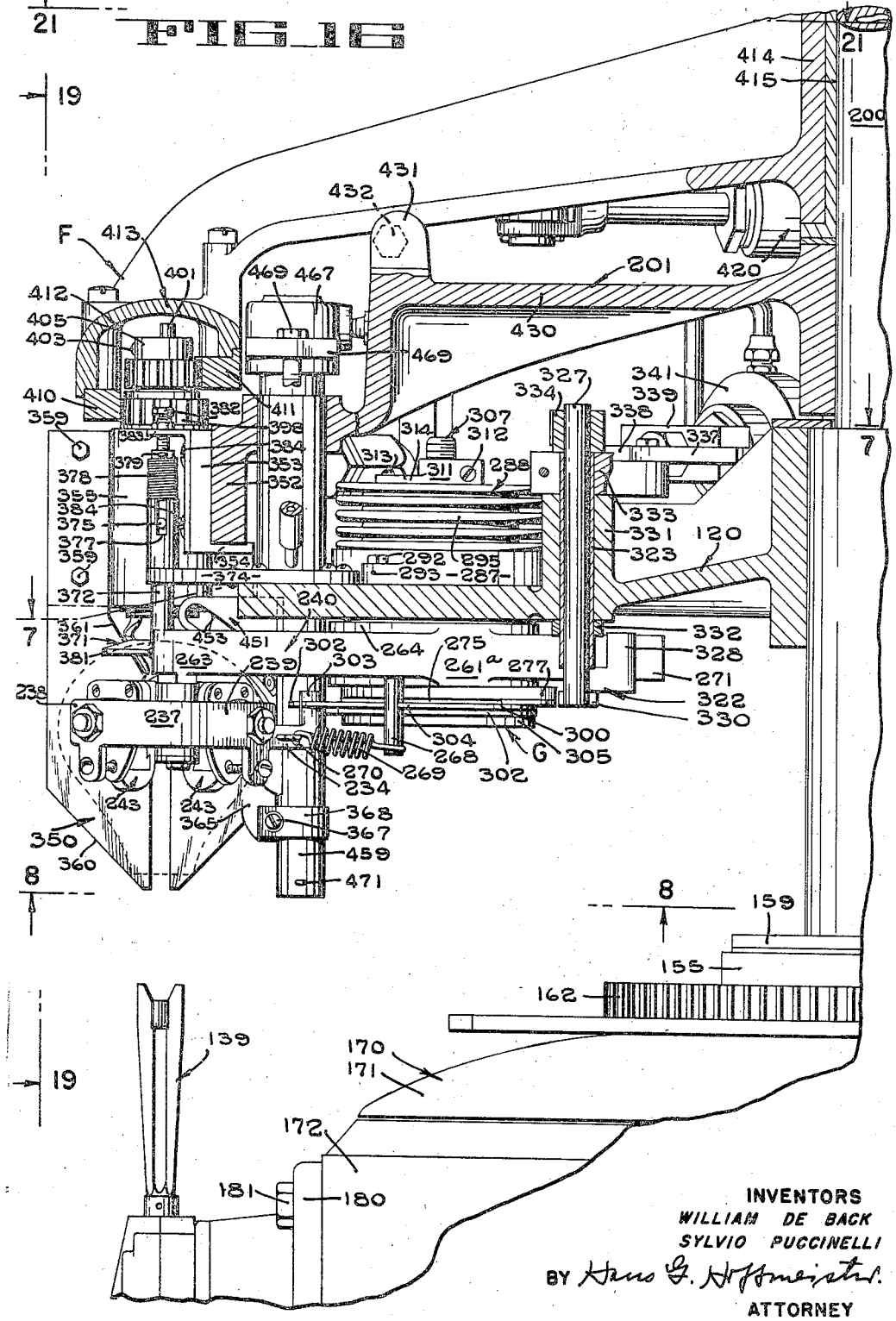

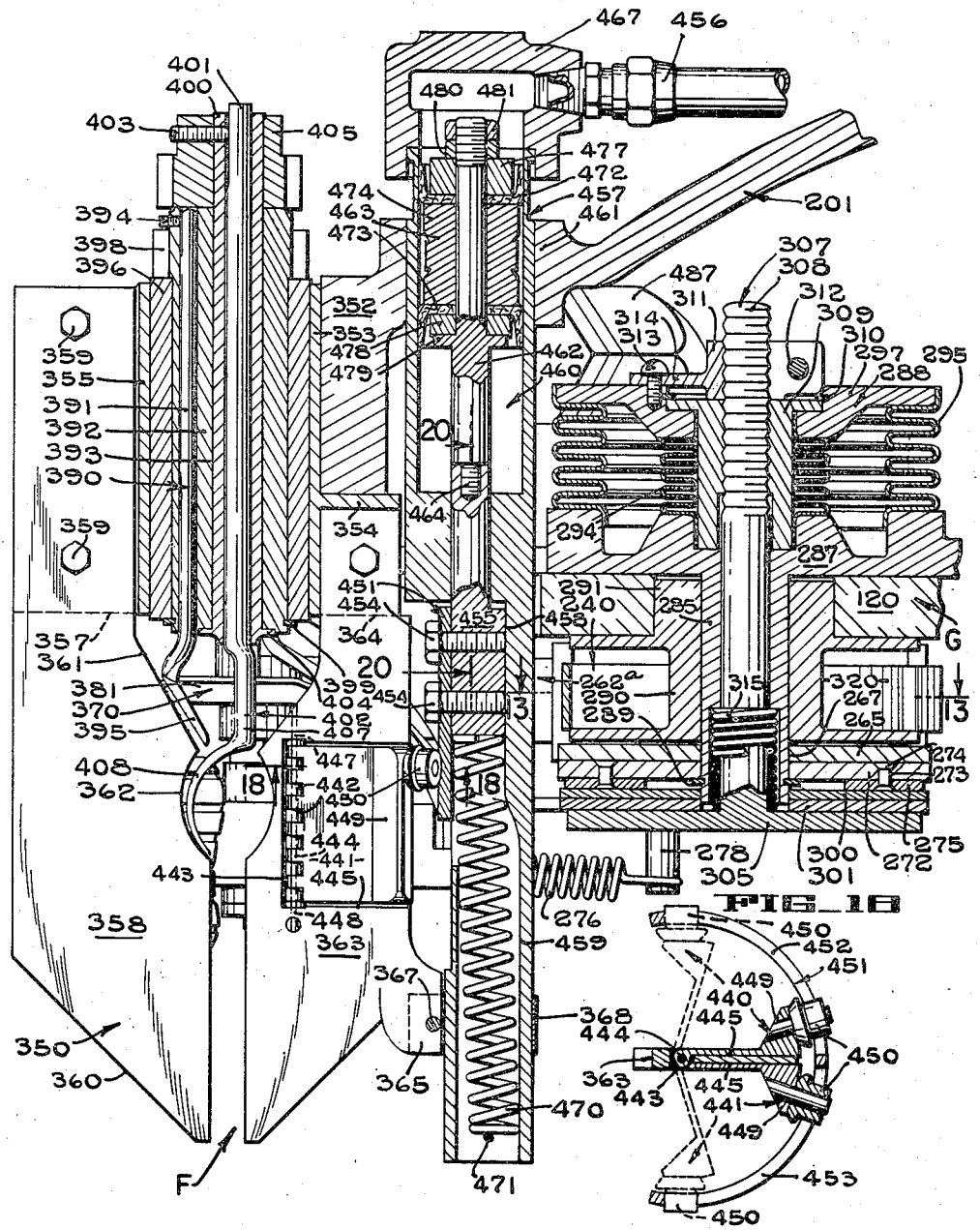

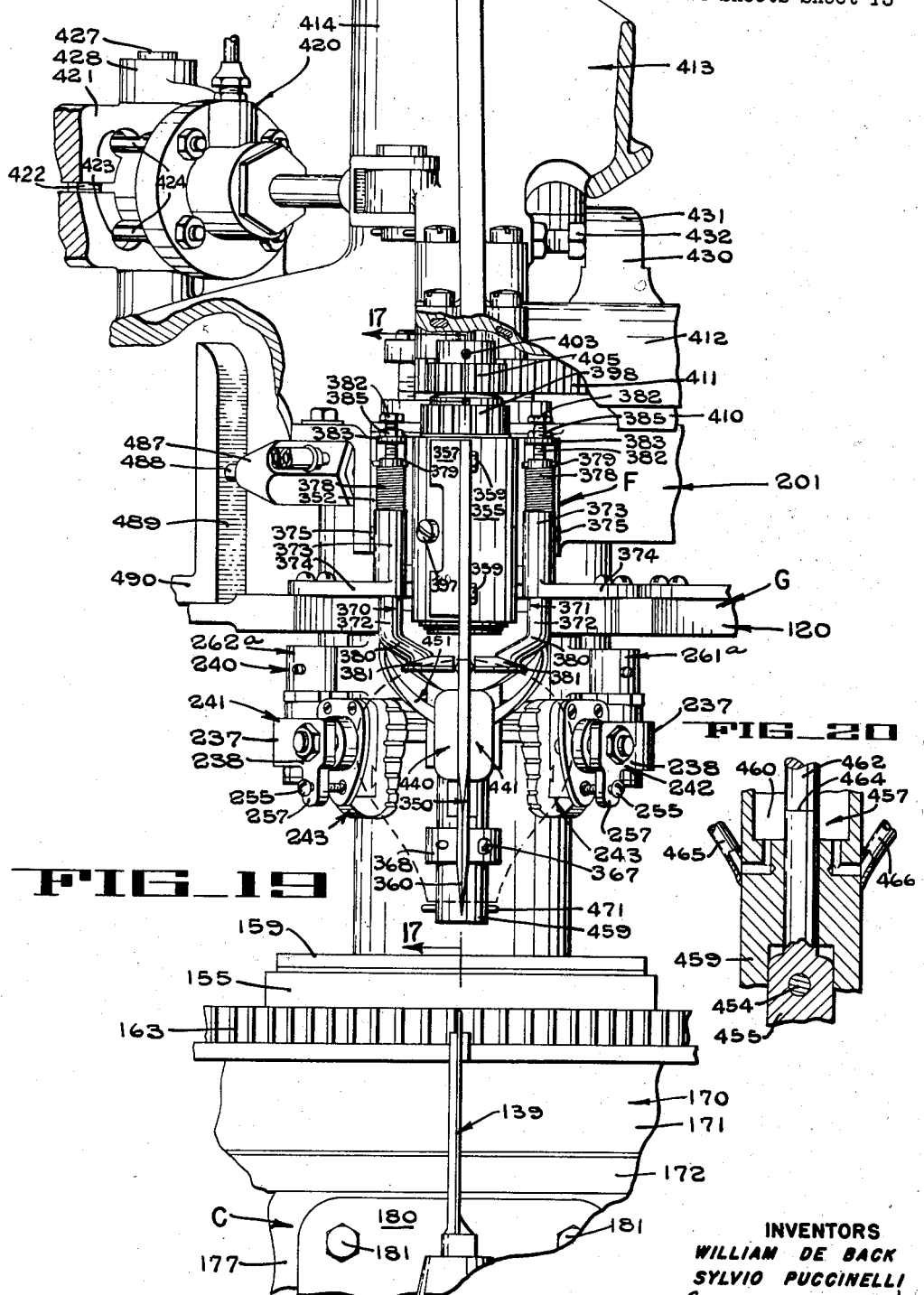

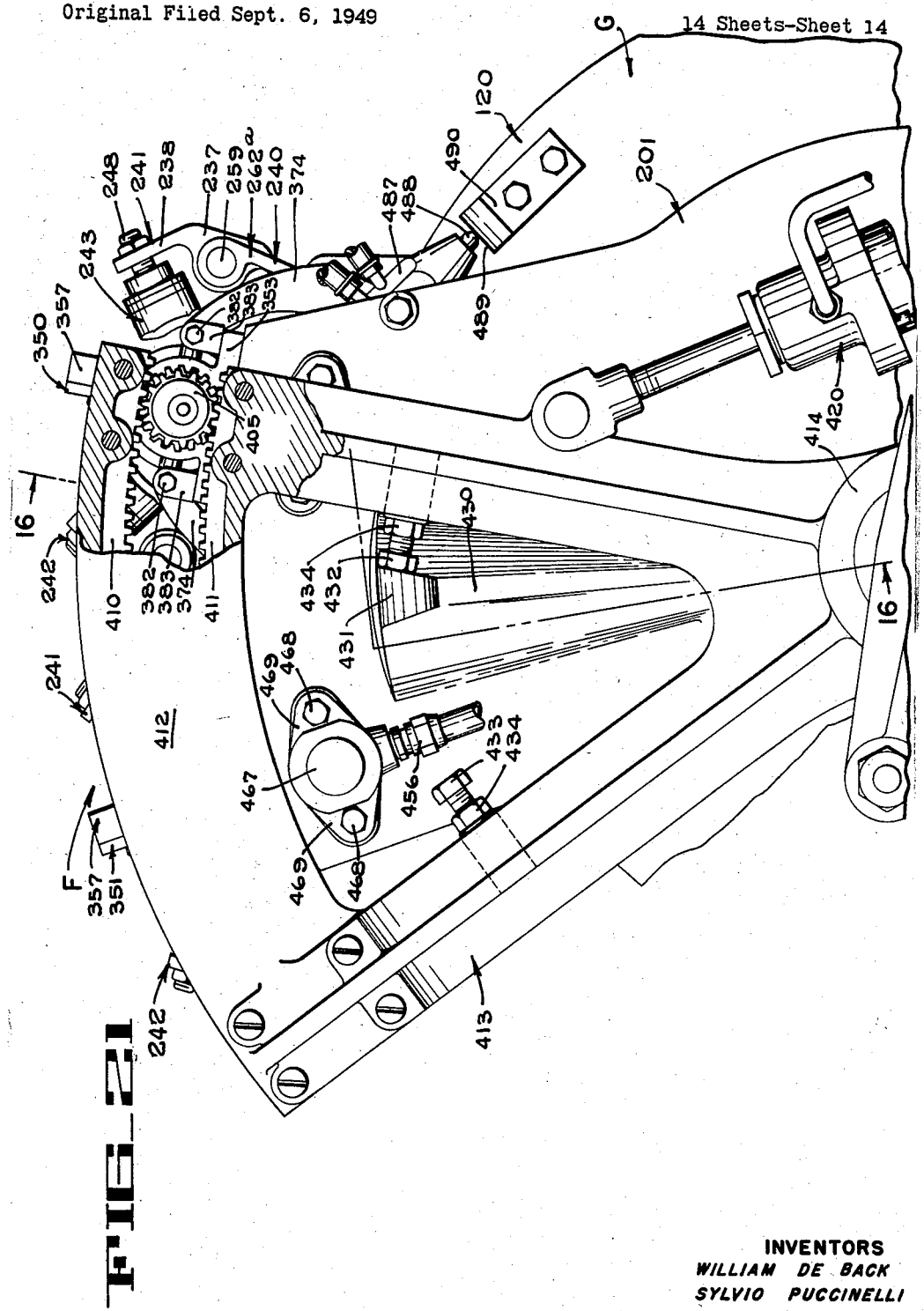

United States Patent Office 2,882,945
Patented Apr. 21, 1959

2,882,945

FRUIT PREPARATION MACHINE

William de Back, St. Nicolas-Waes, Belgium, and Sylvio Puccinelli, San Jose, Calif., assignors to Food Machinery and Chemical Corporation, San Jose, Calif., a corporation of Delaware Original application September 6, 1949, Serial No. 114,168, now Patent No. 2,699,191, dated January 11, 1955. Divided and this application January 7, 1955, Serial No. 480,423

14 Claims. (Cl. 146—40)

This invention appertains to fruit preparation machines, and relates more particularly to improvements in mechanism for preparing fruit, such as pears, for canning or drying.

This application is a division of our co-pending application, U.S. Serial No. 114,168 filed September 6, 1949, now Patent No. 2,699,191, issued January 11, 1955.

An object of the present invention is to provide an improved high speed fruit preparation machine.

Another object is to provide means for transferring fruit from an impaled condition on a cyclically moving stemming tube onto a superposed halving, calyx trimming, and seed cell severing mechanism, the superposed mechanism moving congruently with the stemming tube through a portion of its cycle of movement.

Another object is to provide a fruit preparation machine with improved splitting, trimming and coring facilities.

Another object is to provide means for performing stemming and seed cell severing operations upon fruit in a manner to insure removal of the stem and seed cell from the fruit after it has been prepared.

Another object is to provide means for mounting a calyx trimming knife and a seed cell removing knife for simultaneous rotation in opposite directions above relatively eccentric axes and by similarly relatively eccentric gears.

These and other objects and advantages of the invention will become apparent from the following description in conjunction with the accompanying drawings in which:

Fig. 6 is an enlarged fragmentary section taken in the same plane as Fig. 4 and showing a portion of a stemming tube turret, a stemming tube bushing being shown in section.

Fig. 7 is a fragmentary section taken along line 7—7 of Fig. 16 showing gripping jaws and associated parts for transferring peeled pears onto a splitting knife.

Fig. 8 is a fragmentary bottom section taken along the line 8—8 of Fig. 16 showing the under side of the pear splitting knives and gripping jaws, the jaws being shown in open condition.

Fig. 9 is an enlarged fragmentary perspective of the lower end portions of a pair of coaxial butterfly levers.

Fig. 10 is a view, similar to Fig. 9, showing one of the levers offset axially upwardly from the other.

Fig. 11 is a view similar to Fig. 8 but with the gripping jaws closed over pears which have been drawn up by the gripping jaws onto the splitting knives.

Fig. 12 is an enlarged detail section along line 12—12 of Fig. 11, showing the universal pivotal mounting arrangement for the gripping jaws.

Fig. 12A is a section taken on line 12A—12A of Fig. 12.

Fig. 13 is an enlarged fragmentary horizontal section taken along line 13—13 of Fig. 17, showing a pair of gripper jaw bracket support arms, the end portions thereof being broken away.

Figs. 14 and 15 are similarly enlarged perspective views of the bracket support arms shown in Fig. 13.

Fig. 16 is an enlarged fragmentary vertical section along the line 16—16 of Fig. 21 showing a splitting blade, with associated fruit gripper and associated seed cell severing and calyx trimming mechanism.

Fig. 17 is a further enlarged fragmentary vertical section taken along the line 17—17 of Fig. 19.

Fig. 18 is an enlarged fragmentary section taken along lines 18—18 of Fig. 17.

Fig. 19 is a fragmentary elevation of one coring and splitting station looking in the direction of the arrows 19—19 of Fig. 16.

Fig. 20 is an enlarged fragmentary section along lines 20—20 of Fig. 17.

Fig. 21 is an enlarged fragmentary plan view of the splitting, seed cell severing, and calyx trimming station of the machine taken in the direction indicated by the arrows 21—21 of Fig. 16, a portion of a segmental bracket for actuating the seed cell severing and calyx trimming knives being broken away.

Before entering into a detailed description of the illustrated embodiment of the present invention, the following brief description will assist in an understanding of the general arrangement and operation of the machine. Throughout the present description of the machine, the words "outwardly" and "inwardly" and words of like import will means "radially outwardly or inwardly relatively to the central vertical axis of the machine," while "forwardly" and "rearwardly" and words of similar import will mean "forwardly or rearwardly with respect to the rotative direction of the continuously rotating stemming tube turret." The terms "clockwise" and "counterclockwise" indicate the direction of rotation as viewed from above the machine.

A fruit feeding station A (Figs. 1, 2 and 3) at which an operator stands and feeds fruit into a machine two at a time, is adapted to receive and support containers, or lug boxes as they are called, of the fruit to be prepared, in this instance pears, from an ordinary roller conveyor B. A number of lug boxes are kept constantly at hand on the conveyer, so that as soon as one is emptied another will be immediately available. It will be understood, of course, that any automatic feeding mechanism may be substituted for the hand feeding arrangement illustrated. Such a mechanism is shown, for example, in the patent to Albert R. Thompson, No. 2,596,798.

The feeding station A has two feed cups to receive the pears, stem end down, from the operator. These feed cups are in fruit receiving condition practically all of the time, so that it is not necessary for the operator to maintain a closely timed synchronism of operation with the machine. This tends to speed up operation and greatly reduces operator tenseness and fatigue. The stem ends of the pears are trimmed off in the feed cups just prior to their release therefrom.

Figure 4:
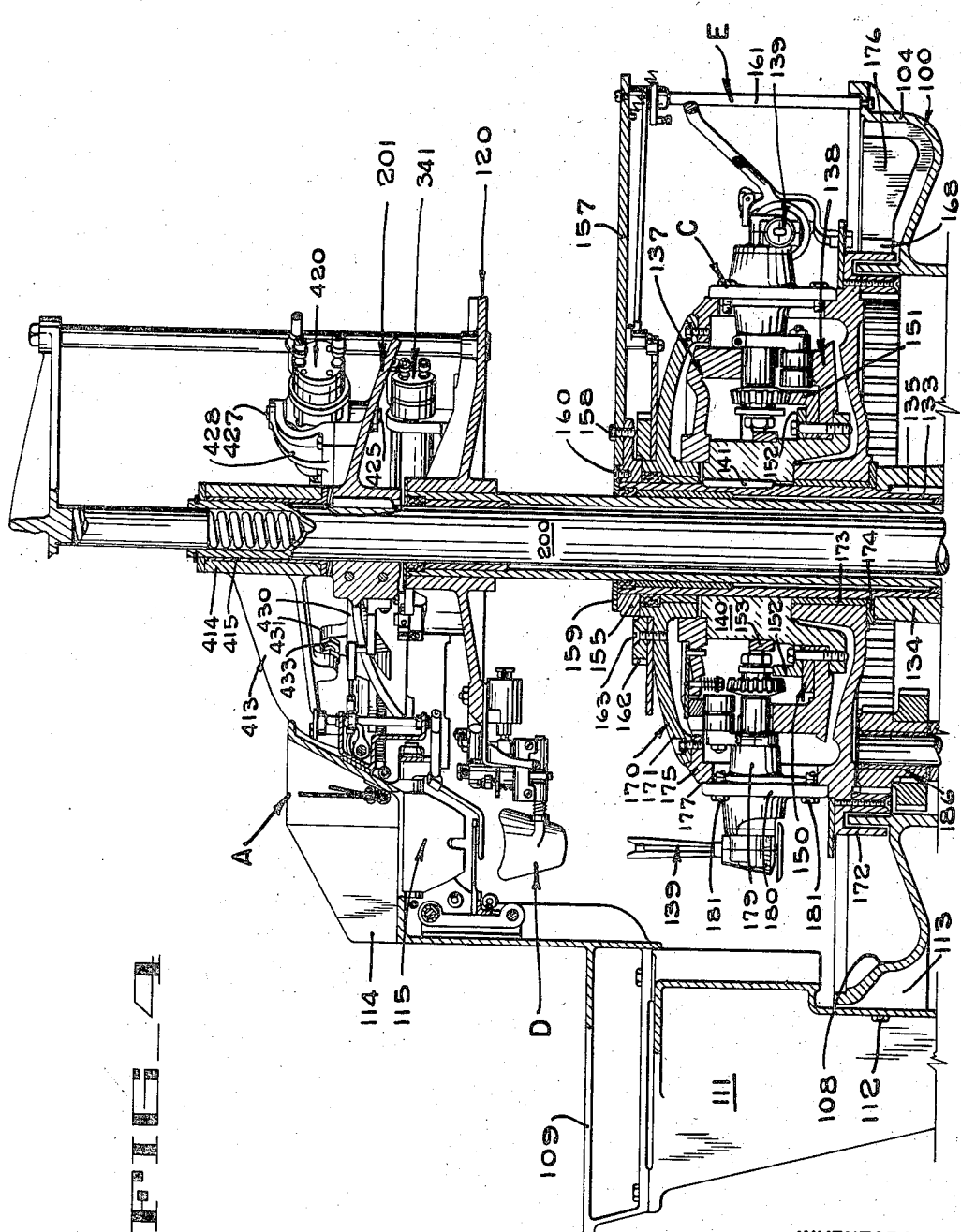
Fig. 4 is a vertical section of the upper half of the machine taken along line 4—4 of Fig. 3.

A continuously rotating stemming tube turret C (Fig. 4) is mounted directly beneath the feed cups. A fruit transfer mechanism D (Figs. 1 and 4) is mounted for combined rotatively oscillating and vertically reciprocating movement to describe a path along a curved upright surface between the feed mechanism and the stemming tube turret. The operation of the transfer mechanism D is so timed with relation to the intermittent operation of the feed mechanism A and the continuous rotation of the stemming tube turret C as to position the transfer means directly beneath the feed cups when they open to discharge their fruit. The transfer means receives the fruit thus dropped, and then, after aligning the fruit axially, moves the fruit slowly downwardly and swings it in axially aligned congruent relation to impaled condition on a stemming tube (Fig. 4). Thereafter, the transfer means releases the fruit, is raised clear of the fruit, and again is returned to fruit receiving position beneath the feed cups in time to receive the next fruit discharged therefrom.

After a pear has been impaled on a stemming tube, the tube is tilted rearwardly from the vertical position, which it occupies during the transfer to the stemming tube stage of the cycle, to an axially horizontal position. In this horizontal position the stemming tube, and the pear impaled thereon, are slowly rotated about their common axis. While thus rotating, the pear is carried past a peeling stage E, Fig. 1, where successive spiral strips of peel are cut lengthwise from the fruit.

Figure 2:
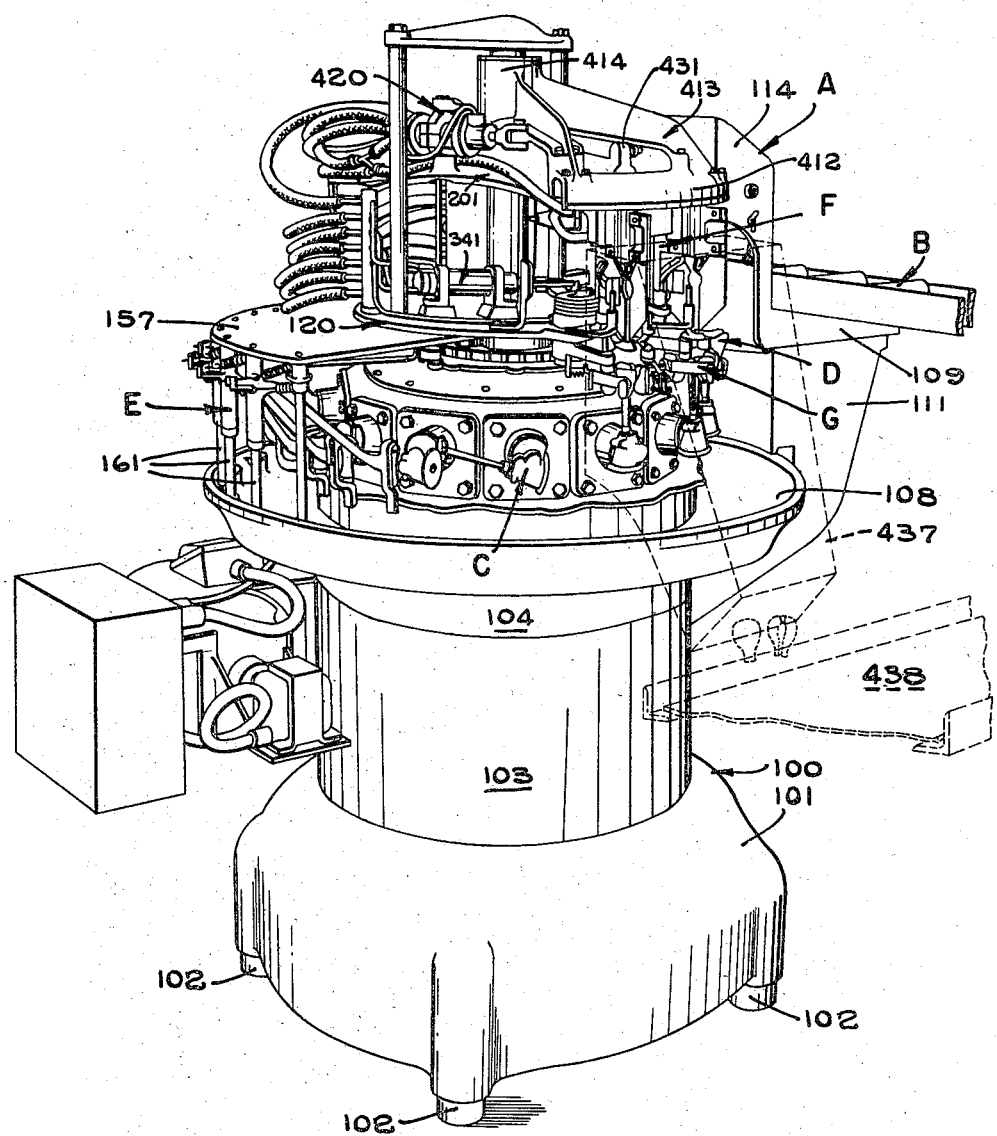
Fig. 2 is a perspective of the fruit ejecting side of the machine, the view illustrating the side opposite to that shown in Fig. 1.

After passing the peeling stage of the cycle the stemming tube and the pear thereon again are swung to axially upright position, and pass beneath a combined fruit halving or splitting, seed cell severing, and calyx trimming station F (Fig. 2). This latter station is mounted to oscillate back and forth in timed relation with the operation of the fruit transferring mechanism D and the continuously rotating stemming tube turret C.

A fruit gripping means G (Fig. 2) is mounted to oscillate with the transfer means D and the splitting, calyx trimming and seed cell severing station F. The gripping means reaches down and grips the pears on the stemming tubes as they pass beneath the splitting station F, and draws the pears upwardly onto station F where the halving, seed cell severing and calyx trimming operations are performed.

Thereafter the fruit halves, now completely prepared, are released by the gripping means G and are ejected from the machine. This completes the fruit preparation cycle, and immediately thereafter the now upright stemming tubes, from which the pears were removed by the gripping means, again pass into alignment with the transfer means D whereupon the above cycle is repeated.

The present divisional application is particularly concerned with the fruit splitting, seed cell severing, and calyx trimming apparatus at station F. The fruit feeding and stem end gauging mechanisms at station A are completely disclosed in the previously mentioned Patent No. 2,699,191, as is also the stem end trimming mechanism, the fruit transfer and impaling mechanism, the stemming tubes and the stemming tube turret, the peeling mechanism, and the control mechanism. The parent application should be referred to for a comprehensive description and complete illustrations of the entire machine.

Frame structure and drive

The general arrangement of the machine and its principal operating assemblies and the manner of driving these principal assemblies by mechanical drive means will now be set forth. It will facilitate an understanding of the illustrative embodiment of the invention if it is borne in mind that the mechanisms pertaining to the orbital travel of the fruit around the machine are driven mechanically, while the mechanisms pertaining to fruit feeding, impaling, calyx trimming, seed celling, splitting, and ejecting are principally operated by pneumatically actuated mechanisms controlled by cam actuated valves operated in timed relation with the mechanical driving mechanism. While having certain advantages, it is obvious, of course, that the pneumatic operation of the illustrated embodiment of the invention could be replaced, by a designer of ordinary skill, with mechanical actuating means such as the usual links, levers, cams, gears and the like employed for such purposes.

Figure 5:
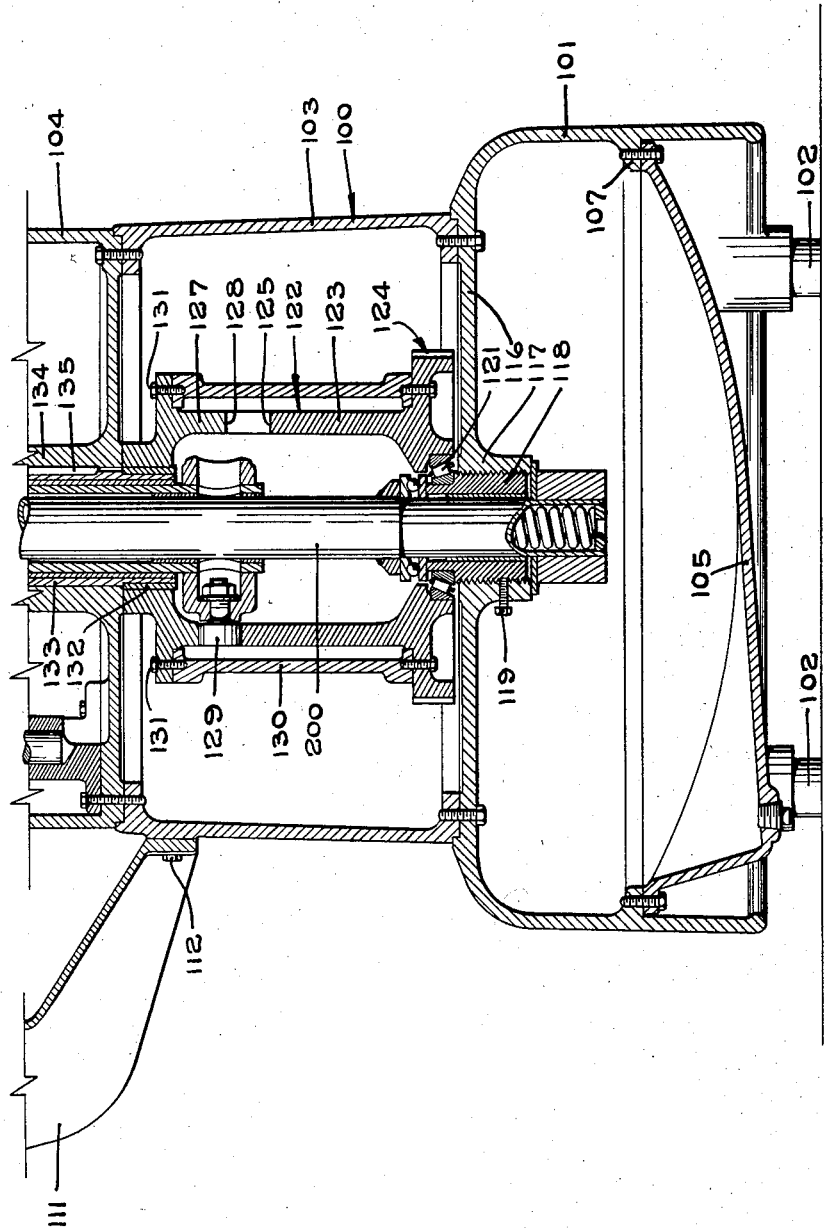
Fig. 5 is a vertical section of the lower half of the machine taken along the same line 4—4 of Fig. 3.

It will be of assistance in visualizing the machine as a whole to join the lower broken line of Fig. 4 with the upper broken line of Fig. 5. This will provide a composite vertical sectional view of the entire machine along the line 4—4 of Fig. 3.

The present machine has a three part supporting base and drive housing 100 (Figs. 1, 2 and 5) comprising a circular lower base portion 101 of inverted cup shape with supporting legs 102 thereon. A substantially cylindrical intermediate base portion 103 is mounted on the lower base portion 101, and an upper cup-shaped base portion 104 is mounted on the upper edge of the intermediate portion 103. An oil sump and bottom closure plate 105 is secured to an inwardly projecting flange 107 in the lowermost base portoin 101.

Figure 1:
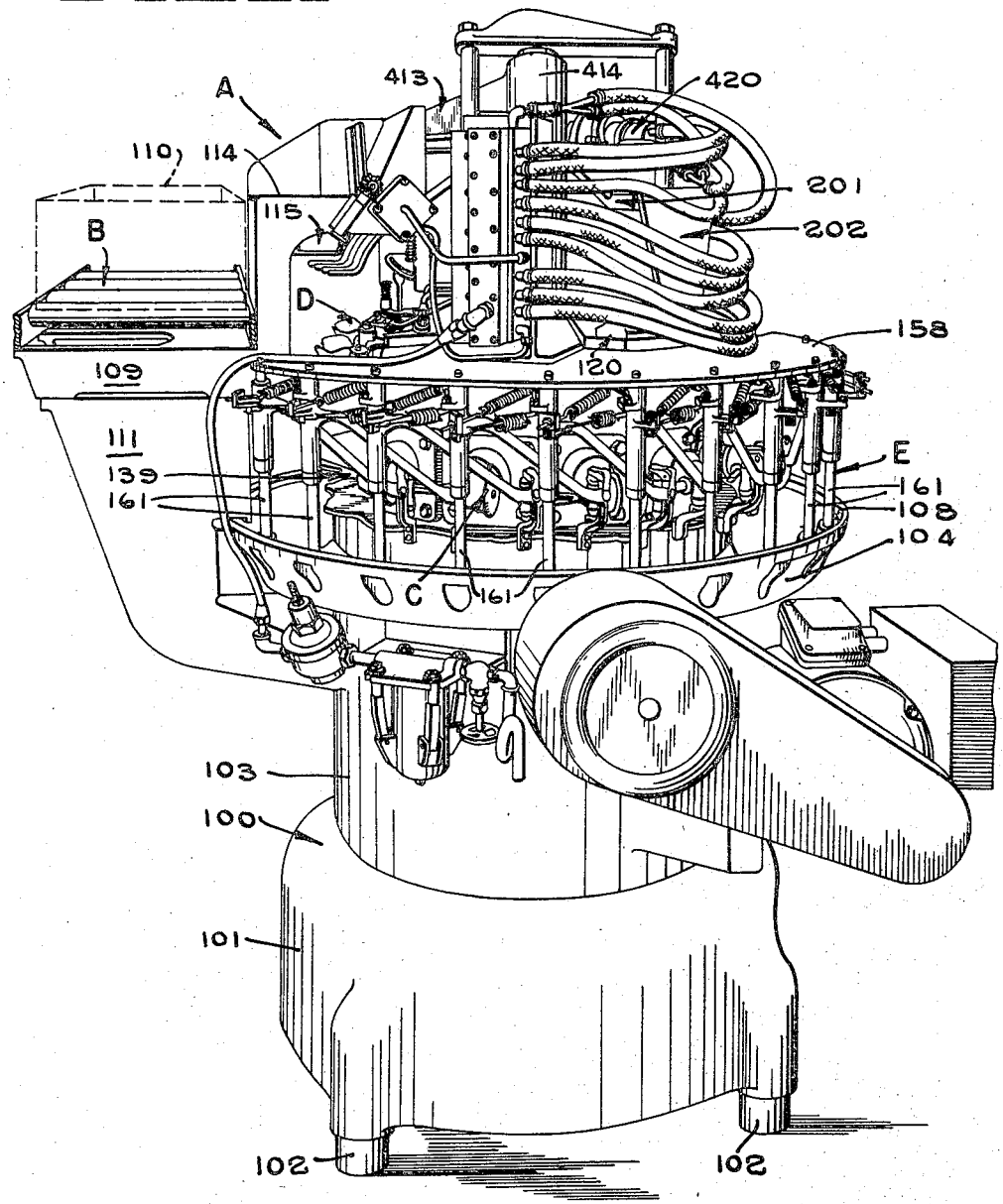
Fig. 1 is a view in perspective of the drive or peeling side of a fruit preparation machine embodying the invention.

A circular horizontal waste trough 108 (Fig. 4), for catching the cores and peelings produced during the operation of the machine, surrounds the upper end of the uppermost base portion 104 and forms an integral part thereof. A lug box table 109 (Fig. 4), for supporting lug boxes 110, indicated in dotted lines in Fig. 1, is mounted on a supporting bracket 111, which is secured by cap screws 112 (Figs. 4 and 5) to a side of the intermediate base portion 103, and also to bosses 113 provided on a side of the annular waste trough 108. This bracket 111 also supports a fruit feed table 114 formed integrally with the feed table 109. A pair of feed cup assemblies 115 are mounted on the feed table.

The top closure plate 116 (Fig. 5) of the lowermost base portion 101, has a downwardly extending boss 117 formed centrally thereof. This boss has an internally threaded hole axially therethrough into which a threaded bearing support bushing 118 is screwed. The bushing is secured in adjusted position by a set screw 119. The bushing 118 has the annular inner race of a roller bearing 121 fitted into an annular recess around its upper end as shown in Fig. 5. The roller bearing 121 is mounted rotatably to support the lower end of a barrel cam 122 which vertically reciprocates a fruit transfer head 120 (Fig. 4) of the transfer mechanism D.

The barrel cam 122 is a composite member, as best shown in Fig. 5, and comprises a lower cylindrical cam portion 123 formed integrally with a lower driven gear portion 124. The lower cylindrical cam portion has a cam face 125 formed on the upper edge thereof. A complementary upper cylindrical cam portion 127 has a lower cam face 128 thereon spaced from the cam face 125 on the lower cam portion 123 by a distance sufficient to permit a cam follower roller 129 to operate between these two cam faces. The upper and lower barrel cam portions 123 and 127 are secured rigidly together in axially aligned adjusted relation by a surrounding cylindrical sleeve 130 which is secured to the upper and lower cam portions by screws 131. The upper barrel cam portion 127 is journalled on a bushing 132 which is mounted on the lower projecting end of a stationary, tubular, central column 133 (Figs. 4 and 5).

The tubular central column 133 has a press fit in an upwardly projecting central boss 134 formed on the bottom plate of the uppermost base portion 104. The column is secured against rotation in this boss by a key 135 (Figs. 4 and 5).

A pair of stationary annular cam tracks 137 and 138 (Figs. 4 and 6) for controlling the tilting movements of stemming tubes 139 as they travel in a circular horizontal orbit around the machine, are mounted on the upper and lower ends, respectively, of an annular hub 140. The hub 140 is mounted on the stationary tubular central column 133, as shown in Figs. 4 and 6, and is secured thereto by a locating key 141 (Fig. 4), and a jamb nut 142 and a bolt 145 (Fig. 6) which are inserted in a hole 144 drilled transversely through the hub. The hole opens substantially tangentially into the axial bore of the hub. The jamb nut and sleeve are drawn into tight frictional engagement with the stationary central column 133 by a bolt.

A ring 150 (Fig. 4), having a segmental toothed rack 151 cut in the upper side thereof, and a stemming tube gear locking ring 152 (Figs. 4 and 6) are bolted in superposed relation on the lower cam track 138. An abutment ring 153 (Figs. 4 and 6) is pressed onto the slightly reduced upper end of the hub 140 to seat in the shoulder formed by the offset between the lower and upper portions of the hub. The abutment ring 153 is of hard smooth metal such as heavy-chrome-plated steel, and is positioned so that the inner ends of stemming tube drive shafts 154 ride along it to receive the thrust of these shafts created upon their rotation by a worm gear mechanism 156.

A stationary mounting flange 155 (Figs. 4 and 6) is clamped tightly around the upper end of the stationary central column 133, and a stationary peeling arm pivot support plate 157 (Fig. 4) is secured to this flange by screws 158. A grease seal retaining washer 159 is secured in place on the plate supporting flange 155 by screws 160. The peeling arm pivot support plate 157 (Fig. 4) fixedly supports the upper ends of a plurality of upright peeling arm pivot pins 161 which are mounted between this stationary plate and the outer marginal edge of the annular waste trough 108. The peeling arms and their associated peeling mechanism are described in the above-mentioned parent application.

From the foregoing it will be apparent that the central column 133, being securely fixed in the boss 134 of the uppermost base portion, will remain stationary during the operation of the machine; as likewise will the annular hub membed 140, the thrust ring 153, the upper and lower stemming tube control cams 137 and 138 mounted on the hub 140, the stemming tube rotary drive rack ring 150, the stemming tube locking ring 152, and the peeling knife pivot support plate 157.

The machine is provided with a stemming tube turret 170 (Figs. 4 and 6) which comprises interconnecting upper and lower turret portions 171 and 172. The lower turret portion 172 is journalled on a bearing bushing 173 on the central column 133, and is supported on a thrust washer 174 (Fig. 4) on top of the boss 134.

The lower turret portion 172 has an upstanding marginal wall 175 around it, on the outer side of which are machined twelve similar, equally spaced, flat, stemming tube mounting faces 177 (Fig. 6). The wall 175, centrally of each of these faces, has openings 178 therethrough to receive twelve stemming tube mounting hubs 179. Each stemming tube hub has a marginal mounting flange 180 formed integrally therewith which overlies and seats on the face 177 around the hole in which the hub 179 is mounted. The flange 180 is secured to the turret wall by cap screws 181.

Figure 3:
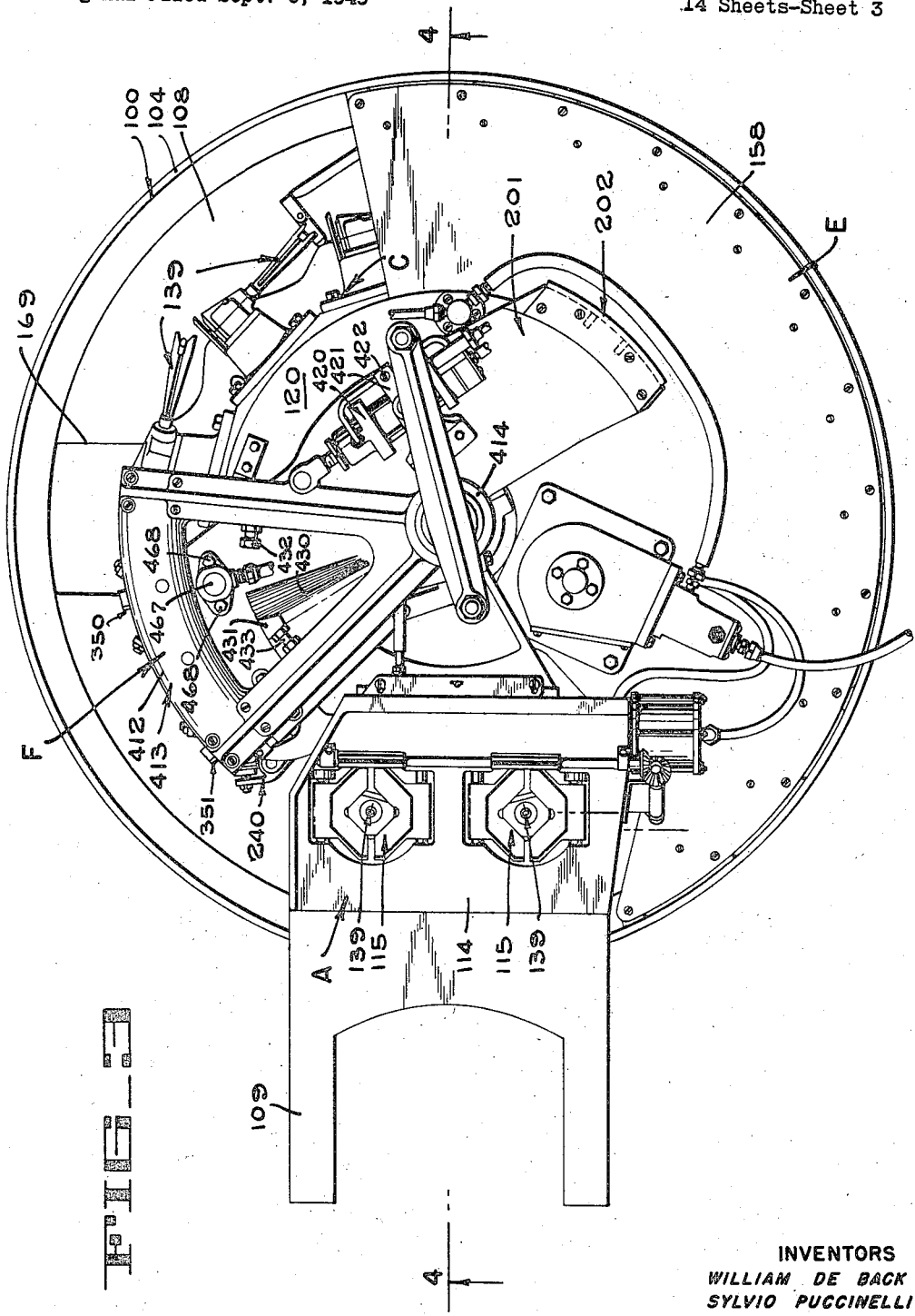
Fig. 3 is an enlarged plan of the machine.

A rubber waste trough wiping blade 176 (Fig. 4) which conforms to the shape of the waste trough 108 is fastened to a radially projecting bracket 168 on the lower stemming tube turret portion 172 to sweep peelings and cores produced by the operation of the machine around the trough and out through a waste discharge opening 169 (Fig. 3).

The upper stemming tube turret portion 171 (Figs. 4 and 6) comprises a domed plate or cover portion 182 which is secured to the upper edge of the marginal wall 175 of the lower turret portion 172 by screws 183. The dome cover plate 182 has a hub portion 184 which is journalled on a bearing sleeve 185 on the stationary column 133. A ring gear 162 (Figs. 4 and 6) for driving a pneumatic control valve mechanism, is mounted on the upper stemming tube turret member by screws 163.

The entire stemming tube turret assembly is rotated as a unit at a constant speed in a counterclockwise direction (Fig. 3) during operation of the machine by means of a gear mechanism which is indicated generally in Fig. 4 by the reference numeral 186. This gear mechanism is fully disclosed in the above-mentioned parent application. As is also disclosed in said parent application, the gear mechanism drives the barrel cam 122, which is arranged to reciprocate the fruit transfer head 120 in a vertical direction, and the gear mechanism also drives a face cam (not shown) which is arranged to oscillate a support tube 200 on which a fruit splitting head 201 is keyed. The transfer head 120 is oscillated by the splitting head 201 through a drive connection 202 (Fig. 1) which permits vertical reciprocation of the transfer head during oscillation.

During operation of the driving motor, the stemming tube turret 170 is rotated continuously at a constant speed, the splitting head 201 is oscillated back and forth, and the transfer head 120 will be reciprocated vertically while being oscillated in synchronism with the splitting head.

*Pear gripping mechanism*

As previously explained, as the stemming turret 170 rotates, a pear is impaled on each upright stemming tube, and the stemming tube is moved to a horizontal position and carried past a plurality of peeling heads. After passing the last peeling head, each tube is again swung to upright position and held firmly in upright position as a pair of the stemming tubes are brought into vertical alignment with a pair of fruit halving or splitting blades by the combined rotative action of the stemming tube turret, and the lateral oscillation of the splitting and transfer heads.

Pear gripping means 240 (Fig. 8) are provided to grip the pears on each succeeding pair of stemming tubes as they are brought into vertical alignment with the splitting blades, and to move the two pairs thus gripped upwardly onto the splitting blades. Each such pear gripping means (Figs. 7 through 11) is mounted on the vertically reciprocating and laterally oscillating transfer head 120, and comprises two similar, but opposite, gripping pad support brackets 241 and 242. Each gripping pad support bracket comprises a mounting hub portion 237 (Fig. 8) with diagonally disposed pad supporting arms 238 and 239. An upwardly extending anchoring pin 303 is provided on the inner end of an extension 234 of the inner arm portion 239 for holding the brackets 241 and 242 against pivotal movement when a clutch is actuated in a manner to be described later herein.

Each of the gripping pad mounting brackets 241 and 242 has a pair of fruit gripping pads 243 mounted thereon. Each gripping pad (Fig. 12) comprises a soft, rubber facing 244 molded onto a supporting backing block 245 of rigid material such as plastic or metal. The gripping face of the rubber facing 244 is curved to conform to the shape of a pear when gripped thereby, and is grooved transversely as at 247 to reduce slippage. Each backing block 245 has a semispherical recess therein in which is inserted the ball end of a mounting stud 248.

A cap 249 fits over the back of the backing block 245 and is secured thereto by screws 250. The cap 249 has a semispherical recess therein complementary to that in the backing block to fit over and retain the ball end of the mounting stud. A cone shaped opening 251 in the cap 249 for the shank of the stud permits limited universal pivotal movement of the gripping pad assembly on the stud. The ball end of the stud has a slotted hole 252 transversely therethrough and a pin 253 is inserted through the slotted hole 252 in the ball end of the mounting stud to prevent rotation of the pads and to limit pivotal movement of the ball in the socket. The ends of the pin 253 (Fig. 12) fit into grooved complementary recesses 253a and 253b (Fig. 12A) provided in the mounting block and in the cap, respectively, to grip the ends of the pin and hold it against displacement. The shanks of the mounting studs 248 are threaded, and are screwed into similarly threaded holes in the mounting brackets 241 and 242 (Figs. 11 and 12). Locknuts 254 secure the studs in adjusted position. A down-limit stop pin 255 (Fig. 12) for limiting the downward pivotal movement of each gripping pad is screwed into a threaded hole in a downwardly extending ear 257 (Fig. 16) two of which are provided on each bracket 241 and 242 below the mounting holes for the gripping pads. A locknut 258 (Fig. 12) secures the down-limit stop pin 255 in threaded adjusted position.

The similar but oppositely formed and positioned gripping pad support brackets 241 and 242 of each pair thereof are pivotally mounted on studs 259 and 260 (Fig. 7) mounted on the outer or free ends of a pair of bracket support arms 261a and 262a (Figs. 13, 14 and 15) to extend downwardly therefrom. One pair of bracket support arms 261a and 262a are shown disassembled in Figs. 14 and 15, and assembled in the sectional view of Fig. 13. In Fig. 13, the outer or free end portions of the bracket support arms are broken away.

Referring first to the bracket support arm 261a shown in Fig. 14, a bracket supporting arm portion 263 thereof extends substantially tangentially outwardly from a circularly curved wall portion 264 and has a drilled boss 266 to receive a pivot pin for pivotally mounting the hub 237 of the gripper pad support bracket 242 thereon. The curved wall portion 264 is mounted concentrically on the marginal edge of a clutch disk portion 265 having a central mounting hole 267 therein. A spring attaching post 268 is welded to extend downwardly from the under side of the margin of the clutch disk portion 265 at its juncture with the arm portion 263.

A bracket positioning coil spring 269 (Figs. 8, 11 and 16) is hooked in tension between this post 268 and a hook 270 mounted on the inner end of the pad supporting bracket 242 pivoted on the arm 261a. The tension of this spring resiliently urges each pad supporting bracket toward a normal position of substantial alignment with its supporting arm. An actuating arm portion 271 (Fig. 14) extends inwardly, and substantially tangentially, from the arcuate wall portion 264 in the opposite direction from the bracket supporting arm portion 263.

The clutch disk portion 265 of the bracket support arm 261a is adapted to rest on, and to be supported by, a generally similar clutch disk portion 272 of the other bracket support arm 262a (Fig. 15) of the pair. The clutch disk portion 272 of this other bracket support arm 262a has a plurality of holes 273 therein for receiving rivets 274 (Fig. 17) which secure an annular, metal, pressure transmitting ring 275 to the under side of the clutch disk portion 272. This pressure transmitting ring 275 is adapted to have frictional clutch engagement with a bracket securing clutch disk 300 (Fig. 17) which is mounted beneath it when the parts are pressed together in a manner to be described later herein. The clutch disk portion 272 (Fig. 15) of the second bracket supporting arm 262a has a radially extending actuating ear 277 thereon which is adapted to be engaged by one of a pair of pneumatically actuated butterfly levers to be described in detail later herein.

A downwardly extending spring attaching post 278 (Figs. 8, 11 and 15), similar to the spring attaching post 268 on the bracket supporting arm 261a, shown in Fig. 14, is mounted peripherally of the clutch disk portion 272 at the juncture of the bracket supporting arm portion thereof with an arcuate wall portion 279 (Fig. 15) for attaching a second bracket positioning spring, 276 (Fig. 8) to a hook 280 mounted on its associated pad mounting bracket.

The pair of bracket support arms 261a and 262a, illustrated in detail in Figs. 13, 14 and 15, are similar to, but are constructed and mounted oppositely from, the second pair 261 and 262 thereof (Figs. 8 and 11). The pair illustrated in detail in Figs. 13, 14, and 15 would, therefore, comprise the lowermost pair 261a and 262a shown in Fig. 8, while the upper pair 261 and 262 in this Fig. 8 would be constructed and assembled exactly opposite to those of the upper pair. Such structural reversals are of course common practice in machine design and will be clear from the above disclosure to those familiar with the art.

The clutch disk portions 265 and 272 of the bracket support arms 261a and 262a are mounted for pivotal movement on the lower end portion of a central downward tubular extension 285 (Fig. 17) of the lower head 287 of a metal clutch actuating bellows 288. A spring retaining clip 289, mounted in an annular groove near the lower end of the tubular downward extension 285, supports and limits the downward movement of the lowermost clutch disk portion 272 of the bracket support arm 262a. The downward tubular head extension 285 is inserted, with a tight press fit, through the axial bore of a spool-like clutch hub 290. The clutch hub 290 has an upwardly extending central locating and mounting boss 291 thereon, which is inserted, also with a tight press fit, into a hole in the transfer head 120. The lower bellows head 287 and its integrally formed, tubular, downward extension 285, and the spool-like clutch hub member 290, thus are securely connected to the transfer head and to each other. The lower bellows head 287 additionally (Figs. 7 and 16) is secured to the transfer head 120 by three screws 292, which pass through ears 293 extending marginally from the lower bellows head 287 and are screwed into threaded holes in the transfer head.

The walls of the bellows 288 (Fig. 17) comprise a usual deeply corrugated or roll formed tubular inner sleeve 294, and a similarly corrugated, outwardly spaced, outer sleeve 295, both of the corrugated sleeves being of thin, springy metal, such as bronze. Both corrugated bellows sleeves are brazed to the lower bellows head 287 and to an upper bellows head 297, to have air tight, sealing connection therewith. A usual actuating fluid supply tube 298 (Fig. 7) is connected by a usual compression fitting 299, to open into the sealed annular space between the two corrugated sleeves for actuation of the bellows.

A pair of similar disk-like pad mounting bracket clutch plates 300 and 301 (Figs. 8, 11, 16 and 17) for anchoring the pad supporting brackets 241 and 242 in pear gripping position, are pivotally mounted on the lower end of the tubular extension 285 of the lower bellows head 287 below the spring clip 289. Each of the gripping pad bracket anchoring disks 300 and 301 (Figs. 8 and 11) has a bifurcated arm 302 projecting radially therefrom. These bifurcated arms 302 are each adapted to receive, between the bifurcations thereof, the upwardly extending pin 303 (Fig. 16) formed on the inner end of each of the pad supporting brackets 241 and 242.

A small, radially projecting ear 304 (Figs. 8, 11 and 16) also is provided on each of the bracket anchoring disks 300 and 301, to lie on the other side of the spring attaching post 278 or 268 from the bifurcated arm 302, and thus to limit rotative movement of the bracket anchoring disks 300 and 301 on which the ears 304 are provided. The bracket anchoring disks are identical to each other, but are mounted oppositely to each other in pairs, as shown, for example, in Fig. 8. Thus the two bracket anchoring disks 300 and 301 of each pair thereof have their bifurcated arms 302 and ears 304 disposed oppositely to each other and with the downwardly extending spring attaching posts 268 and 278 on their associated bracket support arms 261a or 262a therebetween. These bracket anchoring disks 300 and 301 are interposed (Fig. 17) between the lower clutch disk portion 272 of the bracket supporting arm 262a, and the disk-like head 305 of a bellows-actuated pressure transmitting or clutch actuating member 307.

The clutch actuating member 307 has an upwardly extending stem 308 which is slidably inserted through the axial bore of the tubular downward extension 285 of the lower bellows head 287. The upper portion of the stem 308 is threaded, and is screwed through the internally threaded bore of a flanged sleeve 309 (Fig. 17) inserted through a central hole in the upper bellows head 297. A spring clip 310, is inserted in an annular groove in the marginal wall of a recess in the upper bellows head 297, overlies the flanged sleeve 309 and retains it in position therein. A split clamp fitting 311 (Fig. 17) is screwed onto the upper end of the stem 308 of the pressure transmitting member 307 and is clamped thereto by a clamping screw 312. An anchoring screw 313 (Fig. 17) passes through a radially extending ear 314 of the clamp fitting 311 and is screwed into a threaded hole in the upper bellows head 297 to anchor the stem 308 in adjusted position.

A clutch releasing coil spring 315 (Fig. 17) is mounted in an enlarged lower bore portion of the tubular lower bellows head extension 285, and is held in compression between the head 305 of the clutch actuating member, and the offset in the bore, to urge the clutch actuating member 307 downwardly to free the bracket anchoring disks 300 and 301, and the clutch disk portions 265 and 272 of the bracket supporting arms 261a and 262a for pivotal movement on the tubular bellows head extension 285. The lower end of the flanged sleeve 309 (Fig. 17) mounted in the upper bellows head, by abutting against the upper surface of the lower bellows head 287, determines the downward limit of movement of the bellows head, and the clutch actuating member 307 connected thereto, under the thrust of the clutch releasing coil spring 315.

When the bellows 288 is subjected to internal pressure sufficient to overcome the thrust of the clutch releasing spring 315 and to move the clutch actuating member 307 forcibly upward, the bracket anchoring disks 300 and 301 and the clutch disk portions 265 and 272 of the bracket support arms 261a and 262a are gripped, clutch-like, between the head 305 of the clutch actuating member 307 and the bottom face of the clutch hub 290. It will be noted that the pressure transmitting ring 275, riveted to the under side of the lowermost clutch disk portion 272 of the bracket support arm 261a provides clearance for the spring clip 289 around the lower end of the tubular lower bellows head extension 285.

An arcuate leaf spring 320 (Figs. 13 and 17) for urging the bracket support arms 261a and 262a of each pair thereof toward each other into pear-gripping position, is adapted to be sprung to substantially circular form and fitted within the arcuate wall portions 264 and 279 of the bracket support arms 261a and 262a. The curved leaf spring 320 has outwardly bent end portions 318 and 319 which exert a separating thrust against the inner ends of the curved wall portions and thereby produce a torque which urges the bracket support arms 261a and 262a in opposite rotative directions toward each other into pear gripping relation.

The spring 320 is free to act only when the bellows 288 is in clutch releasing condition. At such time the bracket support arms are free to pivot on their tubular pivot support member 285. Therefore, when the bracket support arms are swung toward each other to pear gripping position, by the action of their arcuate leaf spring 320, if the pear to be gripped is offset laterally one way or the other on the stemming tube, the arms will pivot and grip the pear in this offset position without exerting any lateral centering tendencies thereon. This is an important advantage since it is desirable in transferring a pear from the stemming tube to a splitting blade that the pear be impaled on the splitting blade with the tubular cut made in the pear by the stemming tube on the vertical mid-line of the splitting blade, and with the lateral cuts made by the turning wings on the stemming tube in the cutting plane of the splitting blade.

For pivotally moving the arms of both pairs of bracket support arms simultaneously in opposite directions, and against the force of the springs 320, toward their open, fruit releasing positions, a pair of co-axially pivoted, generally similar, but opposite, butterfly levers 321 and 322 are provided (Figs. 8, 9, 10, 11 and 16). One butterfly lever 321 comprises a tubular mounting shaft 323 (Figs. 9 and 10) with a lever block 324 welded to the lower end thereof so that one face of the lever block lies along a longitudinal mid-plane of the tubular shaft. The lower end of the lever block 324 extends below the bottom of the tubular shaft 323 and a lateral lever arm 325 with rounded free end is welded to the lower end of the lever block 324.

The other butterfly lever 322 comprises a rod mounting shaft 327 which is axially inserted for pivotal movement in the tubular shaft 323 of the first butterfly lever 321. The rod shaft 327 is of sufficiently greater length than the tubular shaft 323 to project upwardly above the tubular shaft when the parts are in fully assembled relation as shown in Fig. 16. A lever block 328, generally similar in size and shape to the first lever block 324, is welded onto the lower end of the rod shaft 327 with a face thereof disposed along a vertical mid-plane of the rod shaft, and is adapted to lie closely adjacent the mid-plane face of the first lever block 324 when the parts are assembled as shown in Fig. 9. The top of the second lever block 328 is notched out as shown at 329 (Fig. 10) to receive the lower end of the tubular shaft 323 freely therein, so that when the parts are moved axially into fully assembled relation as shown in Fig. 9, the top of the second lever block 328 will be at the same height as that of the first lever block 324 and the outer ends of the two lever blocks will be at the same radial distance from their common axis of pivotal movement. A second laterally projecting lever arm 330 and similar to the first lateral lever arm 325 is welded to the lower end of the second lever block 328.

The two butterfly levers 321 and 322, when moved axially into fully assembled position, as shown in Fig. 9, are inserted upwardly into the bore of a boss 331 (Fig. 16) on the transfer head 120 for pivotal movement therein. A thrust collar 332 is secured in adjusted position on the tubular shaft 323 by a set screw (Fig. 16) to secure the tubular shaft 323 in adjusted position in the bore of the boss. A pair of split clamp type actuating arms 333 and 334 (Figs. 7 and 16) are secured on the upper ends of the tubular shaft 323 and the rod shaft 327, respectively.

The actuating arms 333 and 334 extend substantially in opposite directions from each other, and their free ends are pivotally connected, by links 337 and 338, to the cross head 339 of a piston rod 340 of a pneumatically actuated cylinder 341 which is mounted on the transfer head 120. The cylinder 341 is of the double acting type. When the cylinder is operated to retract the piston rod 340, the cross head 339, links 337 and 338, and actuating arms 333 and 334, swing the butterfly levers 321 and 322 in opposite rotative directions about their common axis to bring the mid-plane faces of the lever blocks 324 and 328 together to the position shown in Figs. 9 and 11. When the pneumatic cylinder 341 is operated to extend the piston rod 340, however, to the position shown in Fig. 7, the actuating arms 333 and 334 swing the butterfly levers 321 and 322 in opposite rotative directions to the position shown in Fig. 8.

The lever blocks 324 and 328 are located (Figs. 8, 11 and 16) directly between the inwardly extending actuating arms 271 on the two similar, but oppositely formed and located bracket support arms 261 and 261a. These bracket support arms 261 and 261a (Figs. 8 and 11) comprise the two center arms of the two oppositely constructed and mounted pairs of bracket support arms. The laterally extending round nosed lever arms 325 and 330 of the butterfly levers are located directly laterally exteriorly of the actuating ears 277 (Fig. 15) on the two similar but opposite clutch disk portions 272 of the two outer bracket supporting arms 262 and 262a.

When the butterfly levers 321 and 322 are in their relative positions of Fig. 11, the clutch actuating bellows 288 is unpressurized to release the pressure transmitting member 307 to free the clutch disk portions interposed between the head of the pressure transmitting member and the clutch hub 290, the two arcuate leaf springs 320 swing their pairs of associated bracket support arms 261 and 262, and 261a and 262a, toward each other, moving the pad mounting brackets 241 and 242 and their supported fruit gripping pads 243 toward each other into pear gripping position. In this released condition of the clutch, the pad support brackets 241 and 242 also are free for limited pivotal movement against the aligning tension of their coil springs 276 and 269 to allow the pads 243 to conform to the shape of a pear gripped thereby.

When the butterfly levers 321 and 322 are swung, by actuation of the pneumatic cylinder 341 to the relative positions shown in Figs. 7, 8 and 16, the bellows actuated clutch being released, the lever blocks 324 and 328 will be swung apart, engaging the actuating arms 271 on the bracket support arms 261 and 261a and swinging them to the separated position shown in Fig. 8. This also swings the innermost, similar but opposite, bracket support arms 261 and 261a toward each other against the force of their associated arcuate leaf springs 320 (Fig. 13) to their fruit releasing positions shown in Fig. 8. Simultaneously the rounded ends of the laterally extending lever arms 325 and 330 of the butterfly levers will engage the actuating ears 277 on the clutch disks of the remote bracket support arms 262 and 262a and will swing these remote bracket support arms away from each other to fruit releasing position against the force of their curved leaf springs 320 (Fig. 8). The freedom for pivotal adjustment of the gripping pads on their brackets, of the brackets on their support arms, and of the support arms themselves permits the pear to be gripped firmly in any position in which it may be disposed on the stemming tube, the clutch action firmly locks the parts in that position, and the pear then is transferred in that same position onto the splitting blades. This arrangement is desirable since the pear should preferably be split on a plane including the axis of the hole produced therein by the stemming tube.

*Fruit splitting and positioning mechanism*

A pair of fruit halving or splitting blade assemblies 350 and 351 are mounted on the splitting head 201 with the planes of their composite splitting blades disposed vertically and radially of the machine as shown in Fig. 8. Each composite splitting blade is mounted to lie along a central mid-plane of its associated pear gripping and elevating mechanism which is mounted on the transfer head. Since, as pointed out previously herein, the splitting head 201 and transfer head 120 are connected for synchronous swinging or oscillating movement by a drive connection 202 (Fig. 1) these two heads maintain the pear gripping and transferring mechanism and their respective splitting blades in centrally aligned relation throughout the entire operational cycle of the machine. The two splitting blade assemblies 350 and 351 (Fig. 17) are mounted on the vertical outer faces of a pair of mounting flanges 352 provided on the splitting head 201. Both splitting blade assemblies, together with their associated rotating blade mechanisms for severing the seed cells, and trimming the calyx ends of the pears, are similar to each other, so one only thereof will be described in detail.

Each splitting blade assembly 350 (Figs. 16 and 17) has a mounting member 353 with a horizontal flange 354 thereof extending inwardly beneath the lower end of the mounting flange 352. The blade mounting member 353 has an axially vertical tubular portion 355 formed integrally therewith. The tubular portion 355 extends downwardly below the inwardly extending lower flange 354. An outwardly extending, vertical, blade mounting flange 357 (Figs. 8 and 19) is formed integrally with the tubular body portion 355. A blade supporting face of this flange 357 is offset laterally from the vertical radial mid-plane of the tubular portion 355 by a distance equal to half the thickness of an outer blade member 358, which is secured to the blade supporting face of the flange 357 by bolts 359. By this arrangement the outer splitting blade member 358, which is of substantial thickness in accordance with usual practice, has its median plane coincident with the radially disposed, vertical midplane through the tubular portion 355, of the blade mounting member.

The lower edge 360 (Fig. 17) of the outer blade portion 358 is disposed at an acute angle to the vertical and is sharpened to a cutting edge along the mid-plane of the blade. The upper end portion of the outer blade member 358, where it is mounted on the flange 357, is relatively narrow (Fig. 17). Below this narrower upper blade portion, the blade member 358 widens along an inwardly sloping edge 361. The slope of this edge conforms to the cutting angle of a rotary calyx trimming knife to be described later herein. The inner edge of the wider lower portion of the outer blade member 358 is vertical, except where it is curved inwardly at 362 to clear a rotary seed cell severing knife also to be described later herein.

An inner splitting blade member 363 (Fig. 17) is mounted on a vertical, inwardly extending flange 364 of the tubular portion 355 of the blade mounting member 353 below the horizontal mounting flange 354. This inner blade member 363 has edge conformations generally similar, but opposite, to those of the outer splitting blade member 358. An inwardly extending ear 365 (Fig. 17) on the inner side of the inner blade member, is connected, by a screw 367, and band 368, to the downwardly projecting lower end of a tubular spring housing to be described later herein.

The calyx indentations of the pears are reamed out, and the seed cells are severed from the pears after the pears have been split and while the two halves thereof are still gripped in position on the splitting blades. Since the rotary orbits of the calyx trimming and seed celling knives are fixed, it is necessary that the pear halves be accurately positioned on the splitting blades to insure that the calyx and seed cell of each pear half will be located properly on the splitting blade when these knives are rotated. To insure proper positioning of the pear halves on the splitting blade, a pair of butt stops or gauging plungers 370 and 371 (Figs. 7, 8, 16 and 19) are mounted, one on each side of each composite splitting blade, to prevent the pears from being positioned too high on the splitting blade for the successful performance of the calyx trimming and seed cell severing operations. These butt stops 370 and 371 are similar, but opposite, to each other, so one only thereof will be described in detail.

The butt stops 370 and 371 (Figs. 16 and 19) comprise a vertical shaft portion 372 which is mounted for vertical sliding movement in a tubular portion 373 of a mounting bracket 374, which, in turn, is secured by screws to the upper face of the transfer head 120. A guide pin 375 (Fig. 16) is mounted transversely through the vertical shaft portion 372 of the stop, the edges of the pin riding in vertical notches 377 in the upper end of the tubular bracket portion 373 (Fig. 16) to prevent rotative movement of the shaft portion 372 during vertical reciprocation of the stop.

A coil spring 378 surrounds the upper end of the vertical shaft portiton 372 and is held in compression between a cotter pin 379 mounted in a hole through the shaft portion 372 and the upper end of the tubular bracket portion. This spring 378 normally tends to raise the butt stop upwardly in its bracket. Upward slidable movement of the shaft portion 372 is limited by the laterally bent lower end portion 380 (Fig. 19) of the plunger shaft 372. A downwardly facing, concavely curved arcuate, gauging plate 381 is secured to the lower end of each inwardly bent lower shaft portion 380. This curved plate is adapted to engage and to fit over the butt or calyx end of each pear half, as indicated in dotted lines in Fig. 19, when a split pear, gripped by the gripping means 240 is drawn upwardly onto the splitting blade.

The butt stops 370 and 371 are arrested in their upward movement as the transfer head approaches its upper limit of travel by engagement with a pair of stop screws 382 (Fig. 19) mounted on the splitting head 201. Each stop screw is threaded through the horizontal flange of an angle bracket 383 (Fig. 16) which is secured by screws 384 to the outer face of the blade mounting member 353 and is secured in adjusted position by a lock nut 385. The arresting of the upward movement of the butt stops by their associated stop screws before the gripping means reaches its upward limit of movement causes a relatively downward movement of each butt stop with respect to its associated gripping means and against the pressure of its coil spring 378. The amount of this relatively downward movement of the butt stop is determined by the adjusted position of its associated stop screw 382, but is always small to prevent bruising the pears.

*Calyx trimming and seed cell severing mechanism*

The rotary calyx trimming and seed cell severing knives and their operating mechanisms are best shown in Figs. 4, 16, 17, 19 and 21. The calyx trimming knife 390 (Fig. 17) has a shank portion 391 thereof inserted upwardly in a hole extending lengthwise through a wall of a tubular shaft 392 having an eccentric bore 393. The axis of the hole for receiving the shank portion 391 is offset from the true axis of the tubular shaft 392 diametrically opposite to the axis of the eccentric bore 393 through the shaft.

The shank 391 of the calyx trimming knife is secured in adjusted position by a set screw 394. The lower end of the shank 391 is bent laterally away from the axis of the tubular shaft 392 and the calyx trimming blade portion 395 is disposed at an acute angle to the outer end of this laterally bent portion, to describe a truncated cone when swung around by the rotation of its mounting shaft 392, the sides of the cone thus described lying parallel and close to the sloping upper edges of the splitting blade members 358 and 363. The blade portion 395 of the calyx trimming knife is not wider than the thickness of the splitting blade members, so that in its normal position (Figs. 17 and 19) the blade portion will lie wholly between the planes defined by the two sides of the splitting blade members.

The tubular mounting shaft 392 of the calyx trimming knife is journaled in a bearing bushing 396 which is inserted in the vertical tubular portion 355 of the splitting blade mounting member 353 and is secured therein by a set screw 397 (Fig. 19). A spur pinion 398 is formed on the upper end of the tubular calyx knife mounting shaft 392, the hub portion of the pinion having bearing support on the upper end of the bushing 396. A snap ring 399, inserted in a groove around the lower end of the tubular calyx knife mounting shaft 392, retains the tubular shaft against upward displacement in the bushing.

A second tubular shaft 400, with a concentric bore for receiving the shank 401 of a seed cell severing knife 402 therein, is journaled in the eccentric bore of the tubular calyx knife mounting shaft 392. The shank 401 of the seed cell severing knife is retained in adjusted position in its mounting shaft 400 by a set screw 403. A flange 404 around the lower end of the tubular shaft 400 prevents upward displacement thereof. The set screw 403 also passes through the hub of a spur pinion 405 mounted on the upper end of the tubular shaft 400. The pinion 405 has an eccentric bore which is eccentric to the pitch circle of its teeth by an amount equal to the eccentricity of the bore through the calyx knife mounting shaft 392.

The shank 401 of the seed cell severing knife has a laterally offset portion 407 near its lower end, and a curved seed cell severing blade portion 408 is formed on the lower end of the offset portion. This offset of the portion 407 is approximately equal to the eccentricity of the bore of the tubular calyx knife support shaft 392, which in turn is equal to the eccentricity of the bore of the spur pinion 405 which drives the seed cell knife support shaft 400. This offset, together with the eccentricity of the tubular calyx knife mounting shaft 392 upon equal and opposite rotation of the shafts 392 and 400 causes the seed cell severing knife 408 to describe a generally elliptical path, elongated in a direction transversely to the mid-plane of its associated splitting blade while the offset shank portion 407 travels in a straight line in the plane of the splitting blade. This arrangement causes the seed cell severing knife to cut a substantially semi-spherical seed cell containing segment from each pear half on opposite sides of the splitting blade in spite of the fact that the pear halves are separated by the thickness of the splitting blade. The blade portion 408 of the seed cell severing knife is convexly curved in the direction opposite to the shank offset 407, and, like that of the calyx trimming knife, is sufficiently narrow to lie between the planes defining the sides of the splitting blade in which it is mounted.

In their normal or unoperated position of the two blades 395 and 408, the calyx trimming blade 395 is directly above the seed cell severing blade 408, and the eccentric bores of the calyx knife mounting tube 392 and of the spur pinion 405 on the seed cell knife mounting tube 400 are disposed diametrically opposite to each other (Fig. 17) relatively to the axis of rotation of the tubular calyx knife mounting shaft 392. In this condition of the parts, the pitch circles of the teeth on the two spur pinions 398 and 405 are concentric with each other.

Upon each operative cycle of the calyx trimming and seed cell severing knives they are rotated in opposite directions through complete circular arcs of 360°, and then, after a dwell, during which time the pear halves trimmed by this operation have been ejected from the splitting blades, the knives are returned through a reverse rotation of 360° to their normal condition. This simultaneous but opposite rotative actuation of the knives is accomplished by a single back and forth oscillation of a pair of concentrically curved arcuate racks 410 and 411 mounted within a downwardly opening arcuate channel 412, of a segmental bracket 413 (Figs. 4, 16, 19 and 21).

The segmental bracket 413 has a hub portion 414 which is journalled on a bushing 415 (Figs. 4 and 16) on the upper end of the oscillating tube 200 to which the splitting head 201 is secured. The concentrically curved racks 410 and 411 are secured to opposite sides of the downwardly opening arcuate channel 412, the center of curvature of the racks being on the axis of pivotal mounting of the bracket. The outermost rack 410 is toothed internally and has driving engagement with the spur pinion 398 (Figs. 16 and 17) on the calyx knife mounting shaft, while the innermost rack 411 is toothed externally and has driving engagement with the pinion 405 on the tubular shaft 400 of the seed cell severing knife.

Oscillating movement of the segment bracket 413 is accomplished by a double acting air cylinder 420 (Figs. 4, 19 and 21) which is described in detail in the parent application in connection with other pneumatically operated parts of the machine. The cylinder 420 has a trunnion mount 421 clamped around it by a clamp screw 422. The trunnion mount (Figs. 4 and 19) has notches 423

15 therein to clear tie rods 424 which secure the heads on the cylinder 420. A lower trunnion post 425 (Fig. 4) is pivotally mounted in a recess provided in the splitting head 201 to receive it, and an upper trunnion post 427 is pivoted in a similar recess in an arched bracket 428 (Fig. 19) bolted onto the splitting head.

Pivotal movement of the segmental bracket in both directions relatively to the splitting head is limited by a stop abutment 430 formed integrally with the splitting head (Figs. 16 and 21) to extend upwardly therefrom. A stop lug 431 is formed to extend upwardly from the outer end of the abutment 430 and is engaged by the ends of stop bolts 432 and 433 which are screwed into threaded holes through the two side legs of the segmental bracket 413 and are secured in adjusted position by lock nuts 434. Pivotal movement of the segmental bracket 413 swings the arcuate racks 410 and 411 about their common center or curvature, thereby causing their respectively interengaged spur pinions 398 and 405 of the calyx trimming and seed cell severing knives, respectively, to rotate in opposite directions.

The equal and initially opposite eccentricities of the bore of the calyx knife tubular mounting shaft 392 and that of the seed cell knife actuating pinion 405 maintain the latter pinion in uniform toothed engagement with its actuating rack 411 throughout its complete cycle of operation. The pinion 405 is of slightly smaller effective diameter than the pinion 398 so as to be rotated equally with the pinion 398 in spite of the shorter effective stroke of the inner rack 411 due to its lesser radius.

*Fruit ejecting mechanism*

Upon completion of the first 360° rotation of the calyx and seed cell severing knives, caused by the operation of the pneumatic cylinder 420 to actuate the piston thereof and swing the segmental bracket 413 to its full limit of movement relatively to the splitting head 201 upon which the cylinder 420 is mounted, the preparation of the two pears gripped on the splitting blades is completed. The completed pears then are ejected from the machine through a discharge chute 437 (Fig. 2) onto a take-off conveyor 438.

The completely prepared pear halves are ejected from their positions on the splitting blade, immediately after their release by the opening of the gripping means 240, by the rapid actuation of a pair of gate-like ejector flaps 440 and 441 (Figs. 17, 18 and 19) hingedly flush-mounted in correspondingly shaped recesses 445 in the sides of each inner splitting blade member 363. As the ejector flaps swing out from their recesses they break the suction caused by the film of pear juice between each pear half and the splitting blades, and also move the two pear halves laterally away from the blade to clear the core, consisting of the seed cell, stem and stem fibers which it is desirable to retain within the gap between the two blade portions during the ejection of the completely prepared pear halves.

Each ejector flap comprises a plate portion with a notched, hinge-like outer end portion 442 which is interfitted, through an opening 443 provided therefor in the inner splitting blade member 363, with a corresponding notched formation along the vertical outer edge of the similar, but reversed, other ejector flap mounted in a recess in the opposite side of the inner splitting blade member 363. A hinge pintle 444 is inserted downwardly through aligned holes 447 and 448 in the inner splitting blade member, and also through aligned holes in the interfitted hinge portions 442 of the ejector flaps. Each ejector flap has a thickened inner or free vertical edge portion 449. A cam follower roller 450 is mounted to project from each of such thickened edge portions with its axis substantially radially disposed relatively to the axis of the pintle 444.

A cylindrical curved cam plate 451 is mounted, by bolts 454, on a vertically reciprocable piston block 455, with the axis of curvature of the cam plate coincident with that of the hinge pintle 444. The ejector cam plate 451 has a pair of oppositely sloping cam slots 452 and 453 therein (Figs. 16, 17 and 18) to receive the cam follower rollers 450 therein. The piston block 455 is controlled by the operation of a double acting pneumatic cylinder 457 (Figs. 16, 17 and 20).

The piston block 455 (Fig. 17) is connected by a piston rod 462 to the piston 463 of the pneumatic cylinder 457. The piston rod 462 has a screw and socket joint 464 midway of its length to permit separation thereof in mounting and dismounting the parts in the cylinder. The piston 463 is of a usual type with reversely positioned cup washers 472 and 473, a piston body member 474, and washer retainers 477 and 478 mounted between a flange 479 which encircles the piston rod, and a nut 480 and lock nut 481 on the upper end of the piston rod. The piston block 455 is mounted to slide on a flat guide surface 458 formed on a side of the bore of a lower tubular extension 459 of the pneumatic cylinder 457.

The upper portion 460 of the pneumatic cylinder 457 is of larger diameter than the tubular lower extension 459 thereof, and this upper portion is inserted, with a close slidable fit, in a hole in a boss 461 on the splitting head 201 radially inwardly from each splitting blade assembly mounted thereon. The metal band 368 clamped around the lower end of the lower tubular portion 459 and to the ear 365 on the inner splitting blade member 363 secures the cylinder 457 against downward displacement. A cylinder head 467 has an air tight fit on the upper end of the air cylinder portion 460, and is drawn down into close sealing relation therewith by a pair of bolts 468 (Figs. 16, 19 and 21) which pass through flanges 469 projecting laterally from the head. The head bolts 468 are screwed into threaded holes in the splitting head 201.

A coil spring 470 (Fig. 17) is mounted in compression within the lower tubular extension 459 of the cylinder between the lower end of the piston block 455 and a pin 471 mounted transversely across the lower end of the lower tubular cylinder portion. This compression spring urges the piston block 455 and the curved ejector cam plate 451 mounted thereon upwardly toward its upper limit of movement. Since the cam slots 452 and 453 in the curved cam plate 451 slope upwardly and away from the center of the curved cam plate such upward movement of the cam plate moves the cam follower rollers 450 toward each other to swing the ejector flaps 440 and 441 toward each other into their normal or flush-mounted condition in the splitting blade recesses as shown in Fig. 17 and in solid lines in Fig. 18. Introduction of compressed air through a usual compressed air fitting 456 (Fig. 17), mounted in an opening in the cylinder head 467 under pressure sufficient to overcome the force of the compression spring 470 and move the piston 463 rapidly downward, forces the piston block 455 and its supported curved ejector actuating cam plate 451 downwardly, thereby swinging the ejector flaps 440 and 441 apart to their open, fruit ejecting position shown in dotted lines in Fig. 18. Reduction of air pressure in the cylinder 457 above the piston 463 to atmospheric allows the spring 470 to return the parts to their normal condition shown in Fig. 17.

At times some pear pulp or flesh may become lodged in the recesses 445 (Fig. 17) in the inner splitting blade portion 363 in which the ejector flaps seat, and in such cases the force of the spring 470 alone, acting through the cam slots 452 and 453, might not be sufficient to return the ejector flaps to their fully seated flush condition in the splitting blade. In order therefore to insure that the ejector flaps will be fully retracted into their recesses in the splitting blade at the time a pear is impaled on the splitting blade, an additional upward thrust is applied to the piston block 455 and its supported, curved cam plate 451 by introducing compressed air into the lower end of the cylinder 460 (Fig. 20) below the piston therein. For this purpose, a plunger actuated, normally open, cam controlled valve 487 (Figs. 19 and 21) is mounted on the splitting head 201.

A spring biased plunger 488 of the normally open valve 487 is adapted to ride against a vertical cam face 489 on a bracket 490 mounted on the transfer head 120 when the transfer head is in up-raised position and to clear the bracket when the transfer plate is lowered to grip a pear on a stemming tube. When the valve plunger 488 is pressed axially into the valve 487 by the cam face 489 on the bracket it closes the valve and prevents the admission of air to the cylinder 460 below the piston. However, when the cam bracket 490 clears the plunger 488 on the downward movement of the transfer head, the plunger is spring pressed outwardly, opening the valve, and admitting compressed air to the cylinder 460 below the piston 463 and thereby assisting the coil compression spring 470 to forcibly urge the ejector flaps into their recesses in the splitting blade. Tubular air tube connector fittings 465 and 466 (Fig. 20) are welded onto the lower end of one of the ejector actuating cylinders, to convey the compressed air in series to the other ejector actuating cylinder.

*Operation*

When the drive motor of the machine is energized, a drive mechanism is put into operation to continuously rotate the stemming tube turret 170 (Fig. 4) in a counter-clockwise direction (Fig. 3), oscillate the slitting head 201 (Fig. 4) and the transfer head 120, and reciprocate the transfer head as it is oscillated. The gear train and cam mechanisms for carrying out these operations are completely disclosed in the beforementioned Patent No. 2,699,191.

Approximately at the moment a pair of stemming tubes become vertically aligned below the splitting blades of the elevated slitting head 201, the transfer head 120 and the slitting head are swung in a counterclockwise direction to move in synchronism with the stemming tube turret. During this synchronized rotary movement, the transfer head 120 is moved downwardly to carry the gripping pads of two open gripper units 240 on the transfer head into position surrounding peeled pears on two upright stemming tubes. Thed ouble-acting pneumatic cylinder 341 (Fig. 7) is then actuated to release the butterfly levers 321 and 322 (Fig. 8), permitting the arcuate spring 320 (Fig. 13) of each gripper unit 240 to swing the bracket support arms 261a and 262a inwardly to bring the pads into self-adjusting gripping engagement with the pear. Air under pressure is directed into the bellows 288 (Fig. 17) to raise the clutch actuating member 307, against the action of the spring 315, to lock the gripper bracket arms 261 and 262 in fixed position. Then, when the transfer head 120 is elevated, the pear is impaled on the splitting blades 358 and 363, the seed cell severing knife 402 is positioned adjacent the seed cell of the pear halves, and the calyx trimming knife 390 is positioned adjacent the calyx end of the pear halves. Next, the segmental bracket 413 (Fig. 21) is swung counterclockwise by the double-acting air cylinder 420 to rotate the calyx knife 390 and the seed cell knife 402 through 360° in opposite rotary directions, to sever the calyx end of the pear halves and the seed cell of the pear halves. This seed cell severing and calyx trimming operation may take place at any time when the pears are gripped in their uppermost position on the splitting blades. The segmental bracket 413 is held in its counterclockwise or actuated position relative to the splitting head until the then completely prepared pears are ejected from the splitting blades. Upon completion of the dwell of the splitting head 201 and the transfer head 120 in their extreme counterclockwise position, the two heads and the segmental bracket are swung in a clockwise direction, while the transfer head is held in its elevated position.

By the time the splitting and transfer heads have been swung to their initial clockwise rotating position, the pads of each gripper unit 240 will be separated by the venting of the bellows 288 to permit the coil spring 315 to release the clutch parts which lock the pads in pear gripping position. Also, the actuating cylinder 341 is actuated to release the butterfly levers 321 and 322 and permit the arcuate spring 320 to swing the gripping pads to open position. Immediately following the separation of the pads of each gripper unit, the fruit ejector flaps 440 and 441 are operated by admission of compressed air to the upper ends of their vertical cam actuating cylinders 457. This frees the pear halves from the splitting blades and ejects them outwardly where they fall by gravity downwardly through the discharge chute 437 (Fig. 2) and may be received on a take-off conveyor 438 or otherwise in a usual manner.

The calyx trimming and seed celling segmental bracket 413 remains in its counterclockwise actuated position until the pears have been ejected and the ejector flaps 440 and 441 have been permitted to return to their normal, spring pressed, recessed condition in the splitting blades. The stem and seed cell tend to remain in the center vertical gap between the inner and outer portions of the splitting blades after the completely prepared pear halves have been ejected from the splitting blades. This waste matter is thrown out by the counter-rotative movement of the calyx trimming and seed celling knives in their 360° return to normal, and falls downwardly into the waste trough 108, where it is swept into the waste hole 169 in the trough by the rubber wiping blade 176 on the stemming tube turret.

While we have described a preferred embodiment of the present invention it will be understood, however, that various changes and modifications may be made in the details thereof without departing from the spirit and scope of the appended claims.

Having thus described our invention, what we claim as new and desire to protect by Letters Patent is as follows:

1. In a fruit preparation machine, fruit positioning apparatus comprising a support member, a pair of gripper arms pivotally mounted on said support member, a gripper head pivotally mounted on an outer free end of each arm, said heads being disposed in confronting position and arranged for movement toward each other as said arms are pivoted, means for supporting a fruit between said heads, means operatively associated with said arms for pivoting said arms in a direction to move said heads toward each other and into contact with the fruit disposed therebetween, a clutch mechanism mounted on said support member and connected to said arms and to said gripper heads, said clutch being arranged upon actuation to simultaneously lock said arms in selected position and lock each of said heads against movement relative to its associated arm, and means for actuating said clutch mechanism.

2. In a fruit preparation machine, fruit positioning apparatus comprising a support member having a vertical bore, a rod slidably mounted in said bore, a clutch plate connected to said rod and disposed in spaced relation to said support member, a pair of gripper arms pivotally mounted on said support member and having flat plate portions disposed between said clutch plate and said support member, actuating means operatively associated with said gripper arms to pivot said arms to a predetermined position, and power means connected between said support member and said rod and arranged upon actuation to move said rod in a direction to carry said clutch plate toward said support member to lock said arms between said support member and said clutch plate in said predetermined position.

3. In a fruit preparation machine, a movable splitting head mounted for oscillating movement about an axis, a knife having a shank portion rotatably mounted on said head, a gear keyed to said shank portion, a control arm mounted above said splitting head for oscillating movement about said axis, gear means on said control arm in mesh with the gear on said shank portion and arranged to rotate said gear during pivoting movement of said arm relative to said splitting head, and power means operatively connected to said arm and to said splitting head to swing said arm relative to said splitting head.

4. In a fruit preparation machine a splitting blade of substantial thickness having a recess in one marginal edge portion, means for impaling a fruit on said blade to halve the fruit, a pair of ejector flaps pivotally mounted in the recess of said blade, each flap being hinged at one edge portion thereof to the blade and having another edge portion projecting beyond the peripheral edge of said blade, a pair of cam follower rollers mounted one on each of said flaps on the projecting edge portion opposite the hinge mounting pivot thereof, a movable cam plate mounted adjacent said blade and curved co-axially with the axis of hinge mounting, said cam plate having a pair of cam faces thereon adapted to engage said rollers to swing said flaps outwardly from said recess upon actuation of said cam, and actuating means mounted to actuate said cam at a predetermined stage of the operation of said machine to eject a fruit half from said blade.

5. A fruit preparation machine, comprising a support, a splitting blade on said support and having a pair of relatively thick, edgewise spaced apart, blade portions each with a sharpened edge thereon, said blades being adapted to impale a pear with the stem-blossom axis of the pear in the space between said blade portions, a first rotary shaft having an eccentric bore and journaled for rotation in said support adjacent said blade with the axis of rotation of said first shaft centrally aligned with the space between said blade portions, a second shaft journaled in the eccentric bore of said first shaft, said shafts having a normal position with the plane of eccentricity between their axes in the mid-plane of the blade, a calyx trimming knife having a shank portion parallel to said first shaft and mounted to rotate with said first shaft and having a blade portion inclined inwardly toward the axis of rotation of said first shaft, a seed cell severing knife having an offset shank portion and a curved blade portion mounted to rotate with said second shaft, said offset shank portion being offset from the rotative axis of the second shaft, in said normal position of the shafts, in the same direction from the rotative axis of the first shaft and in the same amount as the eccentricity of the bore in the first shaft, and drive means operatively associated with said shafts for rotating said shafts at equal speeds and in opposite directions to swing the calyx trimming knife in a conical path to trim the calyx depression in a pear impaled on said splitting blade, to swing the seed cell severing knife in an elliptical path with its major axis disposed transversely to the plane of the splitting blade, and to move the offset shank portion of said seed cell severing knife along a straight line in the mid-plane of the splitting blade.

6. A fruit preparation machine comprising a stationary base, a rotary turret on said base, a plurality of fruit holder supports tiltably mounted on said turret and arranged to move in a circular path during rotation of said turret, an impaling fruit holder on each support, cam means operatively connected between said base and said fruit holder supports to successively tilt said supports to move said fruit holders between upright and horizontal positions at predetermined stages of their circular path of movement, a splitting head pivotally mounted on said base above said turret for oscillation back and forth over the portion of said circular path wherein the fruit holders are in upright position, a vertical splitting blade on said splitting head, a transfer head pivotally mounted on said base, means mounting said transfer head for oscillating movement with said splitting head and for vertical reciprocating movement between an elevated position adjacent the oscillating path of said splitting blade and a lowered position adjacent the circular path of said fruit holders, a pair of gripper arms pivotally mounted on said transfer head and having end portions arranged to be positioned on opposite sides of said splitting blade when said transfer head is in elevated position and to be positioned on opposite sides of a fruit holder when said transfer head is in lowered position, drive means operatively interconnecting said turret, said splitting head and said gripper mounting means to move the splitting blade and the gripper pads through a portion of their oscillating cycle of movement in congruent relation to a fruit holder moving in said circular path, and power means operatively connected to said gripper arms to pivot said arms to grip a fruit on the adjacent fruit holder when said transfer head is in lowered position.

7. In a fruit preparation machine, a support member mounted for oscillation about a fixed vertical axis, a pair of splitting blades mounted in a common vertical plane on said support member and having spaced apart edges, a first rotary shaft journaled in said support member adjacent said blades with the axis of rotation of said first shaft centrally aligned with the space between said blades, said first rotary shaft having an eccentric bore, a drive pinion mounted co-axially on said first shaft, a second shaft journaled in the eccentric bore of said first shaft, said first and second shafts having a normal position with the plane of eccentricity between their axes in the common plane of said blades, a calyx trimming knife mounted on said first shaft and having a blade portion extending downwardly and radially inwardly toward the shaft axis, a seed cell severing knife having a curved blade portion mounted on said second shaft, a drive pinion mounted eccentrically on said second shaft to be concentric with the drive pinion on said first shaft in said normal position of the shafts, a pair of curved arcuate racks pivotally mounted on said support member to swing about the axis of oscillation of said support member, one of said racks being in toothed driving engagement with one of said pinions, the other rack being in similar engagement with the radially opposite side of the other of said pinions, means for normally securing said racks against movement relatively to said pinions to hold said shafts in normal position, and actuating means operatively connected to said racks to swing said racks about their common pivot axis to rotate said pinions and the shafts upon which they are mounted at equal speeds and in opposite directions.

8. A fruit preparation machine comprising a rotary turret, means for continuously rotating said turret, a fruit holder mounted on said turret for movement in a circular path and adapted to support a fruit in fixed position, a transfer head mounted above said turret for oscillation about the axis of said turret, a pair of gripper members pivotally mounted on said transfer head in an elevated position above said fruit holder and movable in opposite directions toward each other independently of the movement of said transfer head to a fruit gripping position in spaced relation on opposite sides of a vertical reference axis that is aligned directly above the circular path of said fruit holder, means operatively connected to said turret and to said transfer head to oscillate said transfer head to vertically align the fruit holder on the turret with the vertical reference axis of said gripper members during a predetermined portion of the rotation of said turret, means operatively connected to said transfer head for moving said head downwardly toward said turret to position said gripper members on opposite sides of a fruit on said holder, and spring means operatively connected between said gripper members to move said members toward said closed position.

9. A fruit preparation machine comprising a fruit holder adapted to hold a fruit with the stem axis of the fruit in vertical position, means for moving said holder along a fixed orbital horizontal path, a vertical splitting blade mounted for oscillatory movement along a horizontal path directly above said fixed path, gripper means adapted upon actuation to grasp a fruit, said gripping means being mounted for oscillatory movement with said splitting blade along a horizontal path parallel to said fixed path and for movement vertically from an elevated position on opposite sides of said splitting blade to a lowered position on opposite sides of the fruit on said fruit holder, means operatively associated with said fruit holder, said blade and said gripper means for vertically aligning said holder, said blade and said gripper means and synchronizing their horizontal movement during a predetermined portion of the orbital path of movement of said holder, means operatively associated with said gripper means for moving said gripper means from the elevated position to the lowered position, means operatively connected to said gripper means for actuating said gripper means to engage the fruit on said fruit holder while said gripper means are in lowered position, and means connected to said gripper means for raising said gripper means and the fruit therein to elevated position to impale the fruit on said blade.

10. A fruit preparation machine comprising a fruit holder adapted to hold a fruit with the stem axis of the fruit in vertical position, means for moving said holder along a fixed orbital horizontal path, a pair of spaced vertical splitting blades mounted for oscillatory movement along a horizontal path directly above said fixed path, a coring knife of substantially the same thickness as said blades and rotatably mounted between said blades, gripper means adapted upon actuation to grasp a fruit, said gripping means being mounted for oscillatory movement with said splitting blade along a horizontal path parallel to said fixed path and for movement vertically from an elevated position on opposite sides of said splitting blade to a lowered position on opposite sides of a fruit on said fruit holder, means operatively associated with said fruit holder, said blade and said gripper means for vertically aligning said holder, said blade and said gripper means and synchronizing their horizontal movement during a predetermined portion of the orbital path of movement of said holder, means operatively associated with said gripper means for moving said gripper means from the elevated position to the lowered position, means operatively connected to said gripper means for actuating said gripper means to move said gripper means into fruit grasping position while said gripper means are in lowered position, means connected to said gripper means for raising said gripper means to said elevated position carrying the fruit to impaled position on said splitting blades and said coring knife, and means operatively connected to said coring knife to rotate the knife to cut the core from the fruit on said splitting knives.

11. In a fruit preparation machine, an impaling fruit holder adapted to impale a fruit along its stem-blossom axis, means for continuously moving said fruit holder around a closed circular path, a transfer head mounted for oscillation above said fruit holder, a pair of support arms coaxially pivoted on said transfer head, a clutch surface on each of said support arms, a gripper pad support bracket pivoted on each of said support arms, spring means connected between each of said brackets and its support arm normally biasing said bracket toward a position of substantial alignment with the supporting arm, a pair of fruit gripping pads pivoted for limited universal movement on each of said brackets and adapted to grip a fruit therebetween, spring means operatively connected between said support arms for biasing said support arms toward a fruit gripping position, clutch means connected between said transfer head and said clutch surface on each support arm to clutch said arms in fruit gripping position, a pair of oppositely rotatable levers mounted on said transfer head and connected to said support arms to separate said support arms on release of said clutch, and air cylinder means mounted to actuate said separating levers.

12. In a fruit preparation machine, a splitting head, a coring knife mounted in said splitting head for rotation about a vertical axis, a transfer head movable vertically relative to said splitting head, a butt stop resiliently mounted on said transfer head, a stop screw on said splitting head adapted to contact and arrest upward movement of said butt stop as said transfer head approaches the upper limit of its vertical movement relative to said splitting head, a fruit holder arranged to position a fruit directly beneath said coring knife, and gripper members mounted on said transfer head and adapted to grip the fruit on said holder and raise said fruit to a position adjacent said knife, said butt stop being disposed to limit the upward movement of a fruit in said gripper members upon contact with said stop screw.

13. In a fruit preparation machine, a splitting head, a coring knife mounted in said splitting head for rotation about a vertical axis, a transfer head movable vertically relative to said splitting head, a butt stop resiliently mounted on said transfer head, an adjustable stop screw on said splitting head adapted to contact and arrest upward movement of said butt stop as said transfer head approaches the upper limit of its vertical movement relative to said splitting head, a fruit holder arranged to position a fruit directly beneath said coring knife, gripper members mounted on said transfer head and adapted to grip the fruit on said holder and raise said fruit to a position adjacent said knife, said butt stop being disposed to limit the upward movement of a fruit in said gripper members upon contact with said adjustable stop screw, and means for locking said adjustable stop screw in any desired position to accommodate and correctly position fruit of different sizes.

14. In a fruit preparation machine a splitting blade of substantial thickness having a recess in one marginal edge portion, means for impaling a fruit on said blade to halve the fruit, a pair of ejector flaps pivotally mounted in the recess of said blade, each flap being hinged at one edge portion thereof to the blade adjacent the inner edge of said recess, the outer surfaces of said flaps being substantially coplanar with the opposed surfaces of said blade, and means for simultaneously swinging the outer edges of said flaps outwardly away from each other to eject the fruit halves from said blade.

References Cited in the file of this patent
UNITED STATES PATENTS

| | | |
|---|---|---|
| 1,771,641 | Lamb | July 29, 1930 |
| 1,785,011 | Felizianetti | Dec. 16, 1930 |
| 1,785,017 | Thompson | Dec. 16, 1930 |
| 1,811,832 | Mayers | June 23, 1931 |
| 2,158,545 | Kieweg | May 16, 1939 |
| 2,343,098 | Thompson | Feb. 29, 1944 |
| 2,408,599 | Bennett | Oct. 1, 1946 |
| 2,459,368 | Dunn | Jan. 18, 1949 |
| 2,529,727 | Dunn | Nov. 14, 1950 |
| 2,588,790 | Altman | Mar. 11, 1952 |
| 2,609,943 | Winder | Sept. 9, 1952 |
| 2,657,725 | Dunn | Nov. 3, 1953 |